(12) United States Patent
Rodriguez et al.

(10) Patent No.: US 10,630,740 B2
(45) Date of Patent: Apr. 21, 2020

(54) ADDING RECORDED CONTENT TO AN INTERACTIVE TIMELINE OF A TELECONFERENCE SESSION

(71) Applicant: Microsoft Technology Licensing, LLC, Redmond, WA (US)

(72) Inventors: Jose A. Rodriguez, Seattle, WA (US); Jason Thomas Faulkner, Seattle, WA (US); Casey Baker, Seattle, WA (US); Sonu Arora, Kirkland, WA (US); Christopher Welsh, Tacoma, WA (US); Kevin D. Morrison, Arlington, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 41 days.

(21) Appl. No.: 16/169,967

(22) Filed: Oct. 24, 2018

(65) Prior Publication Data

US 2019/0132368 A1  May 2, 2019

Related U.S. Application Data

(63) Continuation of application No. 15/426,992, filed on Feb. 7, 2017, now Pat. No. 10,193,940.

(51) Int. Cl.
*H04L 29/06* (2006.01)
*H04L 12/18* (2006.01)
(Continued)

(52) U.S. Cl.
CPC ........ *H04L 65/403* (2013.01); *H04L 65/1089* (2013.01); *H04L 65/4015* (2013.01)

(58) Field of Classification Search
USPC .................................................. 709/204–206
See application file for complete search history.

(56) References Cited

U.S. PATENT DOCUMENTS

| 6,922,777 B1 * | 7/2005 | Iwamura | G06T 1/0071 |
| | | | 382/100 |
| 9,342,264 B2 * | 5/2016 | Takasu | G07G 1/14 |
| (Continued) | | | |

OTHER PUBLICATIONS

"Notice of Allowance Issued in U.S. Appl. No. 15/427,007", dated Aug. 29, 2018, 08 Pages.
(Continued)

*Primary Examiner* — Jude Jean Gilles
(74) *Attorney, Agent, or Firm* — Newport IP, LLC; Jacob P. Rohwer

(57) ABSTRACT

Described herein is a system that generates and displays an interactive timeline for a teleconference session, where the interactive timeline includes a representation of supplemental recorded content that has been added after a live viewing of the teleconference session has ended. The system can inject the supplemental recorded content into previously recorded content or append the supplemental recorded content to the interactive timeline. Moreover, the system can cause the supplemental recorded content to subsequently be displayed in one of multiple different views. Furthermore, the system can generate and/or distribute a notification of the supplemental recorded content so that participants to the teleconference session can be made aware of additional activity contributed to the teleconference session (e.g., by someone who missed the live viewing of the teleconference session).

20 Claims, 15 Drawing Sheets

(51) Int. Cl.
*G06F 3/06* (2006.01)
*G06F 11/14* (2006.01)

(56) References Cited

U.S. PATENT DOCUMENTS

| | | | |
|---|---|---|---|
| 9,473,396 B1* | 10/2016 | Nittala | H04L 45/38 |
| 9,661,272 B1 | 5/2017 | Daniel | |
| 10,070,093 B1 | 9/2018 | Faulkner | |
| 2002/0194595 A1 | 12/2002 | Miller et al. | |
| 2004/0190700 A1 | 9/2004 | Cutaia et al. | |
| 2005/0256735 A1 | 11/2005 | Bayne | |
| 2006/0126471 A1* | 6/2006 | Tomonari | G11B 27/034 |
| | | | 369/53.2 |
| 2006/0271577 A1* | 11/2006 | Lin | G06F 40/10 |
| 2010/0299616 A1 | 11/2010 | Chen et al. | |
| 2012/0117130 A1 | 5/2012 | Gearhart et al. | |
| 2012/0117659 A1 | 5/2012 | Gearhart et al. | |
| 2012/0124485 A1 | 5/2012 | Scherpa et al. | |
| 2015/0195411 A1 | 7/2015 | Krack et al. | |
| 2015/0237082 A1 | 8/2015 | Duong et al. | |
| 2015/0237084 A1 | 8/2015 | Duong et al. | |
| 2018/0190323 A1* | 7/2018 | de Jong | G11B 27/034 |
| 2018/0218160 A1* | 8/2018 | Wetherall | G06F 21/604 |
| 2018/0227339 A1* | 8/2018 | Rodriguez | H04L 65/403 |
| 2019/0123925 A1 | 4/2019 | Faulkner et al. | |

OTHER PUBLICATIONS

"Non Final Office Action Issued in U.S. Appl. No. 16/046,122", dated Oct. 31, 2018, 13 Pages.

"Final Office Action Issued in U.S Appl. No. 16/046,122", dated May 16, 2019, 11 Pages.

\* cited by examiner

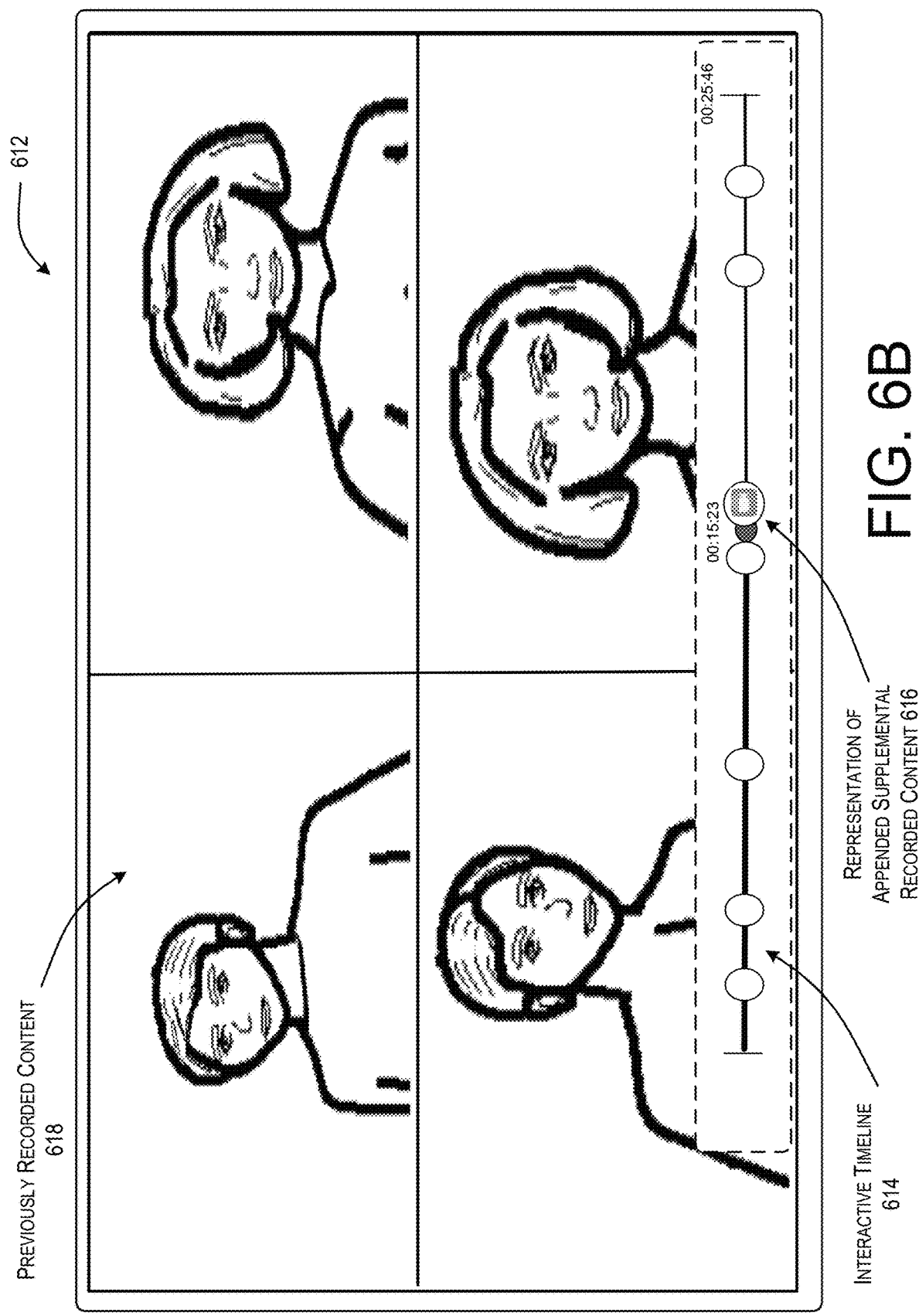

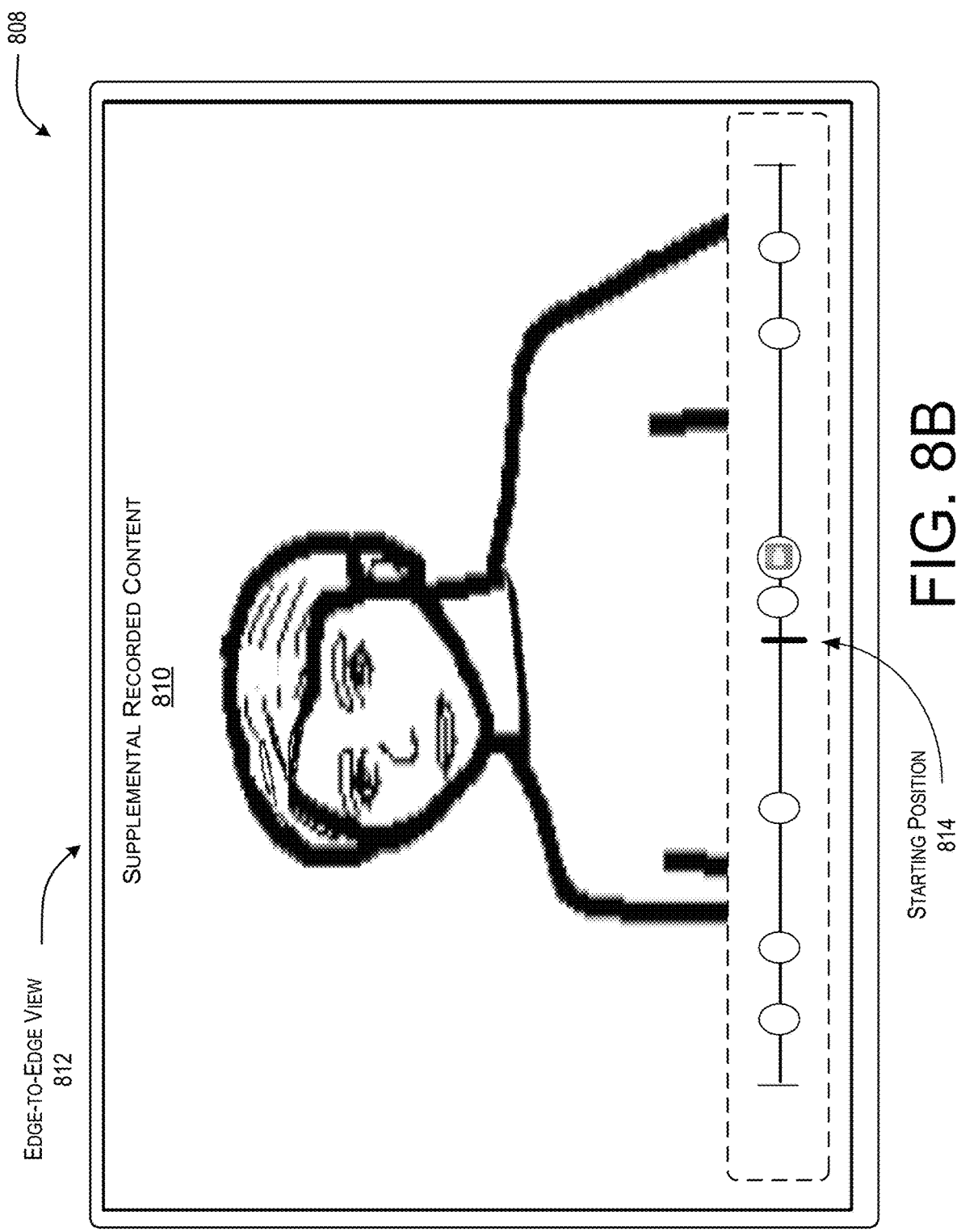

ADDING RECORDED CONTENT TO AN INTERACTIVE TIMELINE OF A TELECONFERENCE SESSION

CROSS REFERENCE TO RELATED APPLICATION

This patent application is a continuation of U.S. patent application Ser. No. 15/426,992, filed Feb. 7, 2017, entitled "ADDING RECORDED CONTENT TO AN INTERACTIVE TIMELINE OF A TELECONFERENCE SESSION," which is hereby incorporated in its entirety by reference.

BACKGROUND

At present, the use of teleconference (e.g., videoconference) systems in personal and commercial settings has increased dramatically so that meetings between people in remote locations can be facilitated. In general, teleconference systems allow users, in two or more remote locations, to communicate interactively with each other via live, simultaneous two-way video streams, audio streams, or both. Some teleconference systems (e.g., CISCO WEBEX provided by CISCO SYSTEMS, Inc. of San Jose, Calif., GOTO MEETING provided by CITRIX SYSTEMS, INC. of Santa Clara, Calif., ZOOM provided by ZOOM VIDEO COMMUNICATIONS of San Jose, Calif., GOOGLE HANGOUTS by ALPHABET INC. of Mountain View, Calif., and SKYPE provided by the MICROSOFT CORPORATION, of Redmond, Wash.) also allow users to exchange files and/or share display screens that present, for example, images, text, video, applications, online locations, social media, and any others.

Teleconference systems enable a user to participate in a teleconference session (e.g., a meeting) via a remote device. In some scenarios, the user may have missed a live viewing of a teleconference session due to a scheduling conflict, for example (e.g., a late lunch, another scheduled meeting at the same time, etc.). In additional scenarios, the user may have missed a live viewing of a teleconference session due to being located in a different time zone, and thus, being on a different schedule (e.g., work day schedule, sleep schedule, etc.). In these types of scenarios, if the user wants to know what previously occurred in the teleconference session, the user typically needs to navigate (e.g., fast forward and/or rewind) a full recording of the teleconference session to try to find the relevant activity that previously occurred. Moreover, in a scenario where the user missed the live viewing of the teleconference session, for example, the user is unable to contribute any activity to the teleconference session because the teleconference session has already ended.

SUMMARY

The disclosed system addresses the problems described above with regards to a teleconference session. Specifically, the disclosed system is configured to enable a user to add content (e.g., a video clip) to a recording of a teleconference session. As described with respect to examples provided herein, previously recorded content of a teleconference session can comprise content that was recorded during a live viewing of the teleconference session (e.g., viewing of live content as the teleconference session is initially being conducted) and/or content that was previously added to the teleconference session before a current user views content of a teleconference session. Thus, the previously recorded content can comprise prior activity of user(s) that participated in a live viewing and/or a recorded viewing of the teleconference session. Supplemental recorded content of the teleconference session can comprise content that is recorded and added to the teleconference session by the current user during a recorded viewing of the teleconference session (e.g., a viewing of the recorded content after the live viewing of the teleconference session has ended). Thus, in accordance with examples provided herein, a current user that missed the live viewing of the teleconference session can still contribute activity to the teleconference session. In various examples described herein, the supplemental recorded content can comprise video content of a user, audio content of a user, audio content of a user along with file content displayed on a display screen (e.g., the user talking about content displayed on his or her computer), and/or stored content accessible via a device and/or over a network (e.g., a stored video clip that had already been recorded).

The system described herein is configured to generate and display a timeline that includes representations (e.g., markers, symbols, icons, nodes, thumbnails, etc.) of notable events that are associated with a teleconference session. The timeline can represent a duration of the teleconference session, and thus, each representation of a notable event on the timeline can be associated with a timestamp, or a time period, based on when the notable event occurs within the duration of the teleconference session. Furthermore, the timeline is interactive (e.g., referred to herein as an "interactive timeline") such that a user is able to interact with individual representations on the timeline. A notable event includes activity (e.g., one or more actions) in a teleconference session that is considered to be important or relevant to understanding a context of the teleconference session, such that knowledge of the activity via a quick view of a representation on the interactive timeline and/or via interacting with the representation to view additional information about the notable event enables a user to efficiently gain an awareness of what has occurred in the teleconference session. The notable events can be of a variety of different types, and thus, the interactive timeline is configured to present different types of representations that correspond to different types of notable events.

In examples described herein, the system is configured to add, to the interactive timeline, a representation of an addition of supplemental recorded content to the teleconference session. Consequently, a type of notable event described herein comprises an addition of supplemental recorded content to the teleconference session. For instance, a team member that lives in a country in Europe may be asleep when the rest of his team located in the United States conducts the live viewing of the teleconference session. Upon waking up the next day and starting work, the team member that lives in the country in Europe can participate in the teleconference session by (i) viewing a recording of the teleconference session, (ii) interacting with the interactive timeline that highlights notable events, (iii) locating a position on the interactive timeline at which he or she wants to add supplemental recorded content (e.g., a video clip of himself or herself), and/or (iv) record and add the supplemental recorded content to the interactive timeline at the position so that the supplemental recorded content can be shared with others even after the live viewing of the teleconference session has ended. Consequently, users that may have missed the live viewing of the teleconference session can still contribute activity to the teleconference session and/or notify other users of the activity that was added after the live viewing of the teleconference session has ended.

In various examples, the user that adds the supplemental recorded content can be presented with options for how the supplemental recorded content is to be added to the interactive timeline and/or to the previously recorded content. In accordance with a selection of a first option, the supplemental recorded content can be injected (e.g., inserted) into the previously recorded content of the teleconference session thereby splitting the previously recorded content of the teleconference session at the position associated with an interactive timeline cursor. In this way, the duration (e.g., a length) of the interactive timeline and/or the teleconference session is extended and a user that subsequently views the content of the teleconference session (e.g., a full recording of the teleconference session from start to finish) views a first part of the previously recorded content until a position of injection, then views the supplemental recorded content that has been injected, and then views a second part of the previously recorded content.

In accordance with a selection of a second option, the supplemental recorded content can be appended to the interactive timeline at the position associated with the interactive timeline cursor. This second option can be considered less invasive to the user experience than the first option because it does not split the previously recorded content. Rather, the supplemental recorded content appended to the interactive timeline is configured for optional viewing in association with the previously recorded content based on selection of a corresponding representation on the interactive timeline. Stated another way, while viewing a full recording of the teleconference session, the user consumes the supplemental recorded content only if she or he requests to view the supplemental recorded content (e.g., via selection of the representation of the supplemental recorded content on the interactive timeline).

In additional examples, the system is configured to generate a notification where the notification indicates that the supplemental recorded content has been added to the interactive timeline. The notification can be added to an object associated with the teleconference session so that participants in the teleconference session can be made aware that a user has contributed additional activity to the teleconference session after the live viewing of the teleconference session has already ended. For instance, the object can be an end-of-session object that is embedded in a chat conversation of a chat application and/or in a calendar of a calendar application. Consequently, upon receiving the notifications, the participants can access the end-of-session object to view the supplemental recorded content added to the teleconference session. In further examples, the system can send the notification as a message (e.g., an email, a text message, etc.) to participants in the teleconference session.

In various examples, to view the supplemental recorded content (e.g., injected content or appended content), a user can select a corresponding representation on the interactive timeline. Based on the selection, the system can identify a position on the interactive timeline associated with a predetermined amount of time (e.g., five seconds, ten seconds, thirty seconds, etc.) that immediately precedes a position on the interactive timeline at which the supplemental recorded content is injected or is appended. Consequently, based on the selection, the playback of content can start at the identified position so that a user sees some of the previously recorded content prior to viewing the supplemental recorded content. This helps provide context to the supplemental recorded content (e.g., why the supplemental recorded content was added). For example, a portion of the previously recorded content that immediately precedes the supplemental recorded content can include a question that was directed to a user who was unable to participate in the live viewing of the teleconference session, and the question can be played back before the supplemental recorded content which, for instance, includes the answer to the question.

The supplemental recorded content can be displayed in one of multiple different views. In some instances, a user that is a source of the supplemental recorded content can provide input specifying a view in which the supplemental recorded content is to be displayed to others. In other instances, a view in which the supplemental recorded content is to be displayed to others can depend on a type of previously recorded content displayed in association with a position at which the supplemental recorded content is added to the interactive timeline. For example, if the type of the previously recorded content is people content, then a default view of the supplemental recorded content can comprise an overlay view in which the supplemental recorded content is played back in the foreground while the people content is paused in the background. In another example, if the type of the previously recorded content is people content, then a default view of the supplemental recorded content can comprise an edge-to-edge view in which the supplemental recorded content completely replaces the people content. In yet another example, if the type of the previously recorded content is file content, then a default view of the supplemental recorded content can comprise a concurrent view in which the supplemental recorded content is played back adjacent to the file content (e.g., side-by-side, top and bottom, non-overlapping display areas). In some instances, a viewer can be presented with options so that he or she can select a preferred view for the supplemental recorded content.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 6B illustrates an example graphical user interface that illustrates (i) how supplemental recorded content is added to the interactive timeline as appended content that is configured for optional viewing and (ii) a corresponding representation of the added supplemental recorded content on the interactive timeline.

FIG. 8B illustrates an example graphical user interface configured to display the supplemental recorded content in accordance with an edge-to-edge view.

DETAILED DESCRIPTION

Examples described herein enable a system to generate and display an interactive timeline for a teleconference session, where the interactive timeline includes a representation of supplemental recorded content that has been added after a live viewing of the teleconference session has ended. The system can inject the supplemental recorded content into previously recorded content or append the supplemental recorded content to the interactive timeline. Moreover, the system can cause the supplemental recorded content to subsequently be displayed in one of multiple different views. Furthermore, the system can generate and/or distribute a notification of the supplemental recorded content so that participants to the teleconference session can be made aware of additional activity contributed to the teleconference session (e.g., by someone who missed the live viewing of the teleconference session).

Various examples, implementations, scenarios, and aspects are described below with reference to FIGS. 1 through 11.

Figure 1:
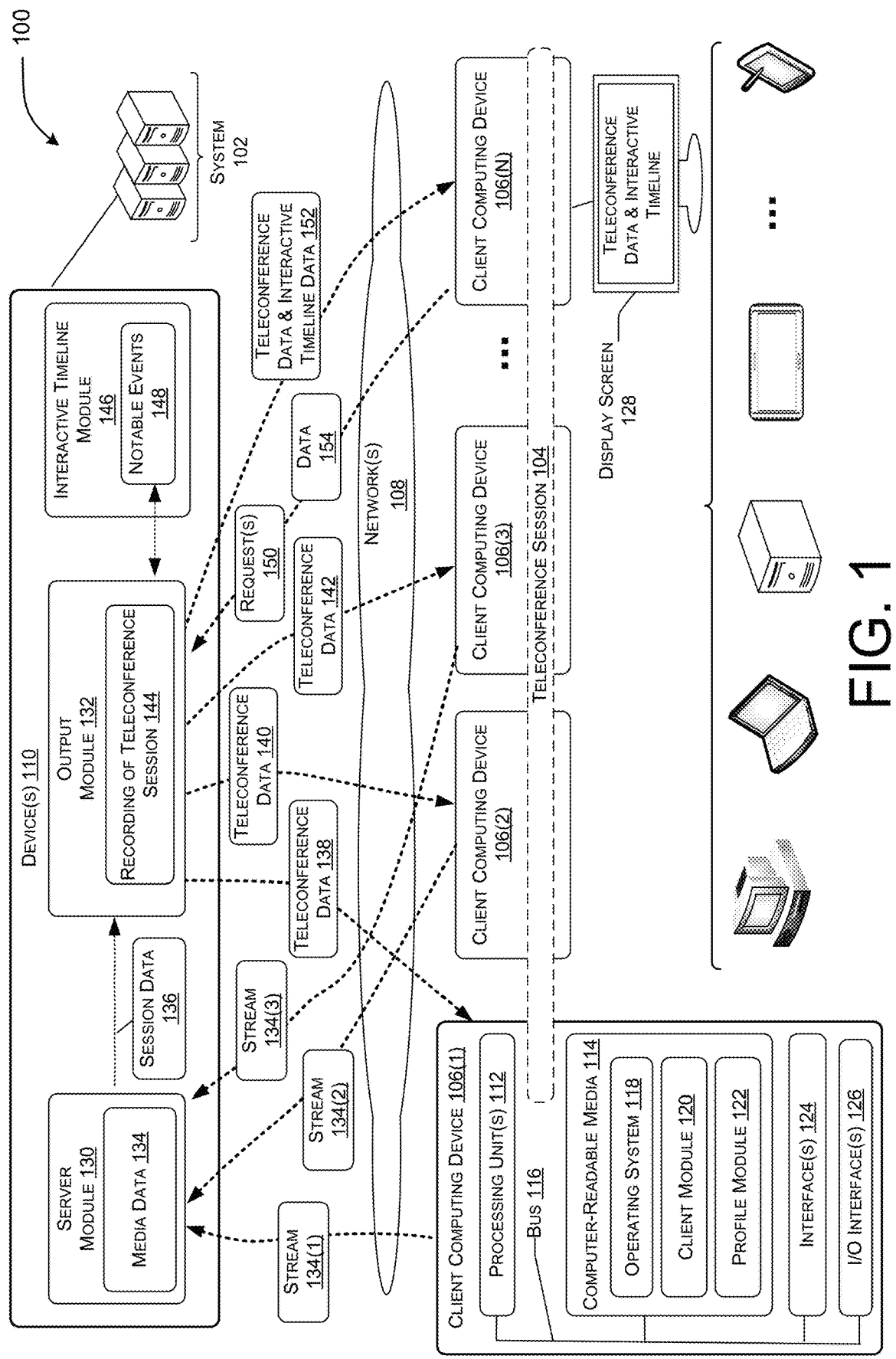
FIG. 1 is a diagram illustrating an example environment in which a system can add supplemental recorded content to an interactive timeline to be displayed on a client computing device.

FIG. 1 is a diagram illustrating an example environment 100 in which a system 102 can operate to generate an interactive timeline for a teleconference session 104 and to add a representation of supplemental recorded content to the interactive timeline. In this example, the teleconference session 104 is implemented between a number of client computing devices 106(1) through 106(N) (where N is a positive integer number having a value of two or greater). The client computing devices 106(1) through 106(N) enable users to participate in the teleconference session 104. In this example, the teleconference session 104 is hosted, over one or more network(s) 108, by the system 102. That is, the system 102 can provide a service that enables users of the client computing devices 106(1) through 106(N) to participate in the teleconference session 104 (e.g., via a live viewing and/or a recorded viewing). Consequently, a "participant" to the teleconference session 104 can comprise a user and/or a client computing device (e.g., multiple users may be in a conference room participating in a teleconference session via the use of a single client computing device), each of which can communicate with other participants. As an alternative, the teleconference session 104 can be hosted by one of the client computing devices 106(1) through 106(N) utilizing peer-to-peer technologies.

In examples described herein, client computing devices 106(1) through 106(N) participating in a teleconference session 104 are configured to receive and render for display, on a user interface of a display screen, teleconference data. The teleconference data can comprise a collection of various instances, or streams, of content. For example, an individual stream of content can comprise media data associated with a video feed (e.g., audio and visual data that capture the appearance and speech of a user participating in the teleconference session). Another example of an individual stream of content can comprise media data that includes an avatar of a user participating in the teleconference session along with audio data that captures the speech of the user. Yet another example of an individual stream of content can comprise media data that includes a file displayed on a display screen along with audio data that captures the speech of a user. Accordingly, the various streams of content within the teleconference data enable a remote meeting to be facilitated between a group of people and the sharing of content within the group of people.

The system 102 includes device(s) 110. The device(s) 110 and/or other components of the system 102 can include distributed computing resources that communicate with one another and/or with the client computing devices 106(1) through 106(N) via the one or more network(s) 108. In some examples, the system 102 may be an independent system that is tasked with managing aspects of one or more teleconference sessions such as teleconference session 104. As an example, the system 102 may be managed by entities such as SLACK, WEBEX, GOTOMEETING, GOOGLE HANGOUTS, etc.

Network(s) 108 may include, for example, public networks such as the Internet, private networks such as an institutional and/or personal intranet, or some combination of private and public networks. Network(s) 108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 108 may utilize communications protocols, including packet-based and/or datagram-based protocols such as Internet protocol ("IP"), transmission control protocol ("TCP"), user datagram protocol ("UDP"), or other types of protocols. Moreover, network(s) 108 may also include a number of devices that facilitate network communications and/or form a hardware basis for the networks, such as switches, routers, gateways, access points, firewalls, base stations, repeaters, backbone devices, and the like.

In some examples, network(s) 108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, and so forth), and other standards.

In various examples, device(s) 110 may include one or more computing devices that operate in a cluster or other grouped configuration to share resources, balance load, increase performance, provide fail-over support or redundancy, or for other purposes. For instance, device(s) 110 may belong to a variety of classes of devices such as traditional server-type devices, desktop computer-type devices, and/or mobile-type devices. Thus, although illustrated as a single type of device—a server-type device—device(s) 110 may include a diverse variety of device types and are not limited to a particular type of device. Device(s) 110 may represent, but are not limited to, server computers, desktop computers, web-server computers, personal computers, mobile computers, laptop computers, tablet computers, or any other sort of computing device.

A client computing device (e.g., one of client computing device(s) 106(1) through 106(N)) may belong to a variety of classes of devices, which may be the same as, or different from, device(s) 110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality (AR) device, an implanted computing device, an automotive computer, a network-enabled television, a thin client, a terminal, an Internet of Things ("IoT") device, a work station, a media player, a personal video recorders ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 106(1) through 106(N) of the various classes and device types can represent any type of computing device having one or more processing unit(s) 112 operably connected to computer-readable media 114 such as via a bus 116, which in some instances can include one or more of a system bus, a data bus, an address bus, a PCI bus, a Mini-PCI bus, and any variety of local, peripheral, and/or independent buses.

Executable instructions stored on computer-readable media 114 may include, for example, an operating system 118, a client module 120, a profile module 122, and other modules, programs, or applications that are loadable and executable by processing units(s) 112.

Client computing device(s) 106(1) through 106(N) may also include one or more interface(s) 124 to enable communications between client computing device(s) 106(1) through 106(N) and other networked devices, such as device(s) 110, over network(s) 108. Such network interface(s) 124 may include one or more network interface controllers (NICs) or other types of transceiver devices to send and receive communications and/or data over a network. Moreover, a client computing device 106(1) can include input/output ("I/O") interfaces 126 that enable communications with input/output devices such as user input devices including peripheral input devices (e.g., a game controller, a keyboard, a mouse, a pen, a voice input device such as a microphone, a touch input device, a gestural input device, and the like) and/or output devices including peripheral output devices (e.g., a display, a printer, audio speakers, a haptic output device, and the like). FIG. 1 illustrates that client computing device 106(N) is in some way connected to a display device (e.g., a display screen 128), which can display the interactive timeline for the teleconference session 104, as shown.

In the example environment 100 of FIG. 1, client computing devices 106(1) through 106(N) may use their respective client modules 120 to connect with one another and/or other external device(s) in order to participate in the teleconference session 104. For instance, a first user may utilize a client computing device 106(1) to communicate with a second user of another client computing device 106(2). When executing client modules 120, the users may share data, which may cause the client computing device 106(1) to connect to the system 102 and/or the other client computing devices 106(2) through 106(N) over the network(s) 108.

The client computing device(s) 106(1) through 106(N) may use their respective profile module 122 to generate participant profiles, and provide the participant profiles to other client computing devices and/or to the device(s) 110 of the system 102. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for teleconference sessions.

As shown in FIG. 1, the device(s) 110 of the system 102 includes a server module 130 and an output module 132. The server module 130 is configured to receive, from individual client computing devices such as client computing devices 106(1) through 106(3), media streams 134(1) through 134(3). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 130 is configured to receive a collection of various media streams 134(1) through 134(3) (the collection being referred to herein as media data 134). In some scenarios, not all the client computing devices that participate in the teleconference session 104 provide a media stream. For example, a client computing device may only be a consuming, or a "listening", device such that it only receives content associated with the teleconference session 104 but does not provide any content to the teleconference session 104.

The server module 130 is configured to generate session data 136 based on the media data 134. In various examples, the server module 130 can select aspects of the media data 134 that are to be shared with the participating client computing devices 106(1) through 106(N). Consequently, the server module 130 is configured to pass the session data 136 to the output module 132 and the output module 132 may communicate teleconference data to the client computing devices 106(1) through 106(3). As shown, the output module 132 transmits teleconference data 138 to client computing device 106(1), transmits teleconference data 140 to client computing device 106(2), and transmits teleconference data 142 to client computing device 106(3). The teleconference data transmitted to the client computing devices can be the same or can be different (e.g., positioning of streams of content within a user interface may vary from one device to the next). The output module 132 is also configured to record the teleconference session (e.g., a version of the teleconference data) and to maintain a recording of the teleconference session 144.

The device(s) 110 can also include an interactive timeline module 146, and in various examples, the interactive timeline module 146 is configured to determine notable events 148 in the session data 136 and/or notable events added to the recording of the teleconference session 144. For instance, a notable event 148 can occur as a live viewing of the teleconference session 104 is initially being conducted and/or recorded such that activity that amounts to notable events by users of client computing devices 106(1) through 106(3) that are participating via the live viewing can be determined and added to an interactive timeline by the interactive timeline module 146. A notable event 148 can also occur in association with a recorded viewing of the recording of the teleconference session 144.

As described above, one type of a notable event 148 comprises the addition of supplemental recorded content to the teleconference session 104 and/or to the interactive timeline. Additional types of notable events 148 can include: a specific mention of a user (e.g., an "@mention"), a specific mention of a team, a file or a display screen that is shared (e.g., a document, a presentation, a spreadsheet, a video, a web page, etc.), a comment that is submitted to a chat conversation that is associated with (e.g., is part of) the teleconference session, a task that is assigned, a poll that is conducted, an expression (e.g., an emoji) that is shared, a link to an external object such as another teleconference session (e.g., a link to a newly scheduled meeting while a current meeting is being conducted), a user joining the teleconference session, a user leaving the teleconference session, an explicit flag added to the interactive timeline by a user to mark an important moment, a time period of concentrated activity, or any other activity determined to provide value or contribute to understanding a context of the teleconference session.

A client computing device such as client computing device 106(N) can provide a request 150 to view a recording of the teleconference session 104. In response, the output module 132 can provide teleconference data and an interactive timeline data 152 to be displayed on a display screen 128 associated with the client computing device 106(N). The teleconference data transmitted to client computing device 106(N) comprises previously recorded content of the teleconference session 104. As further described herein, a user of client computing device 106(N) can provide input(s) to add supplemental recorded content to the teleconference session 104 and/or to the interactive timeline, and data 154 associated with the supplemental recorded content can be transmitted from client computing device 106(N) to the system 102 so that the recording of the teleconference session 144 and the interactive timeline can be updated with the supplemental recorded content. This enables other participants (e.g., users of client computing devices 106(1) through 106(3)) to consume or view the supplemental recorded content after the live viewing of the teleconference session has already ended.

Figure 2:
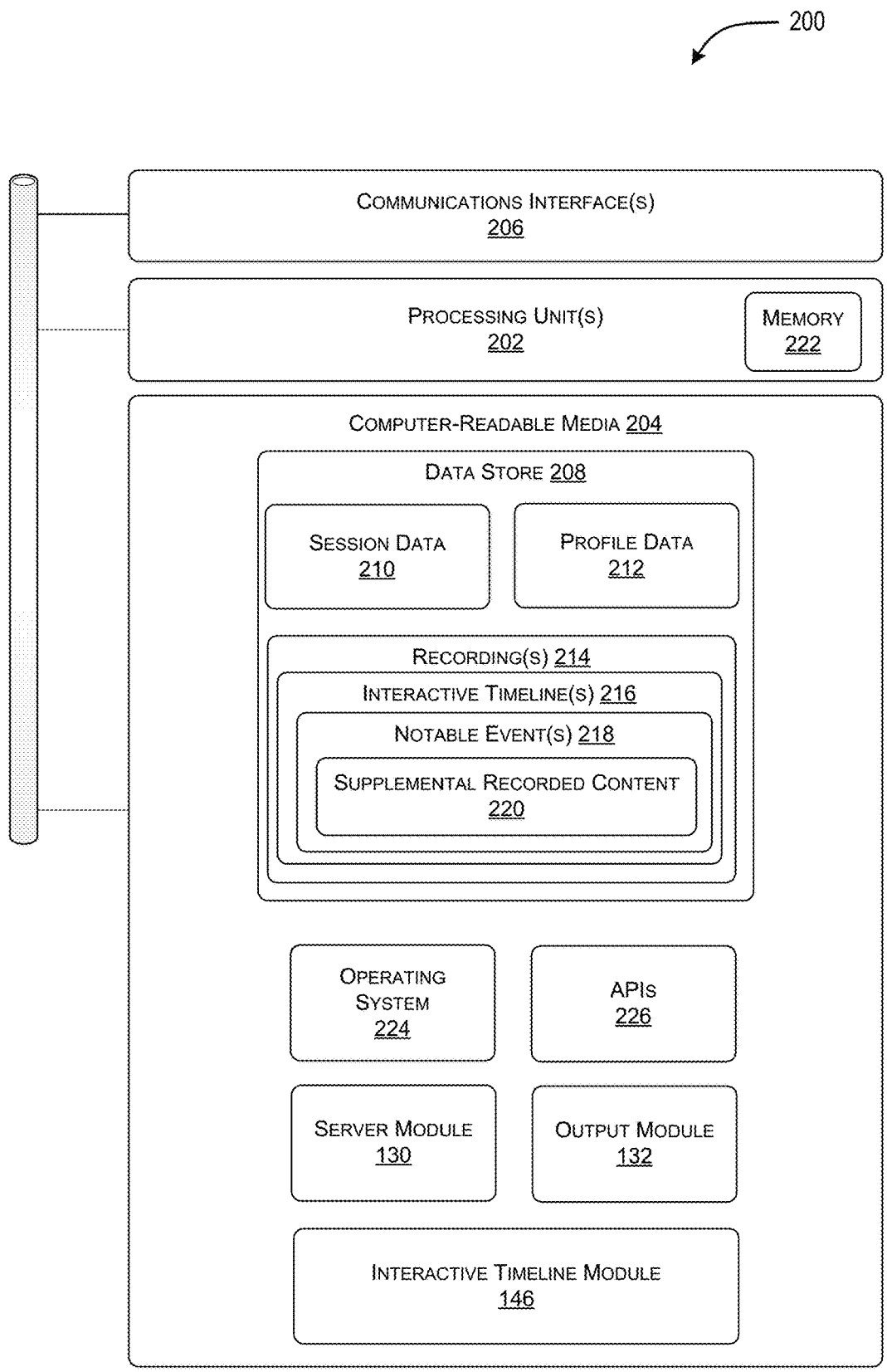
FIG. 2 is a diagram illustrating example components of an example device configured to add supplemental recorded content to an interactive timeline to be displayed on a client computing device.

FIG. 2 illustrates a diagram that shows example components of an example device 200 configured to generate an interactive timeline for a teleconference session 104 and to add supplemental recorded content to the interactive timeline. The device 200 may represent one of device(s) 110, or in other examples a client computing device (e.g., client computing device 106(1)), where the device 200 includes one or more processing unit(s) 202, computer-readable media 204, and communication interface(s) 206. The components of the device 200 are operatively connected, for example, via a bus, which may include one or more of a system bus, a data bus, an address bus, a PCI bus, a Mini-PCI bus, and any variety of local, peripheral, and/or independent buses.

As utilized herein, processing unit(s), such as the processing unit(s) 202 and/or processing unit(s) 112, may represent, for example, a CPU-type processing unit, a GPU-type processing unit, a field-programmable gate array ("FPGA"), another class of digital signal processor ("DSP"), or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 204 and/or computer-readable media 114, may store instructions executable by the processing unit(s). The computer-readable media may also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media may include computer storage media and/or communication media. Computer storage media may include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random-access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 206 may represent, for example, network interface controllers ("NICs") or other types of transceiver devices to send and receive communications over a network.

In the illustrated example, computer-readable media 204 includes a data store 208. In some examples, data store 208 includes data storage such as a database, data warehouse, or other type of structured or unstructured data storage. In some examples, data store 208 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 208 may store data for the operations of processes, applications, components, and/or modules stored in computer-readable media 204 and/or executed by processing unit(s) 202 and/or accelerator(s). For instance, in some examples, data store 208 may store session data 210 (e.g., session data 136), profile data 212 (e.g., associated with a participant profile), and/or other data. The session data 210 can include a total number of participants (e.g., users and/or client computing devices) in the teleconference session 104, and activity that occurs in the teleconference session 104, and/or other data related to when and how the teleconference session 104 is conducted or hosted. The data store 208 can also include recording(s) 214 of teleconference session(s), and interactive timeline(s) 216 that include representations of notable event(s) 218 that occur in association with the teleconference session(s). As described herein, a type of notable event 218 can include an addition of supplemental recorded content 220 to the interactive timeline.

Alternately, some or all of the above-referenced data can be stored on separate memories 222 on board one or more processing unit(s) 202 such as a memory on board a CPU-type processor, a GPU-type processor, an FPGA-type accelerator, a DSP-type accelerator, and/or another accelerator. In this example, the computer-readable media 204 also includes operating system 224 and application programming interface(s) 226 configured to expose the functionality and the data of the device 200 to other devices. Additionally, the computer-readable media 204 includes one or more modules such as the server module 130, the output module 132, and the interactive timeline module 146, although the number of illustrated modules is just an example, and the number may vary higher or lower. That is, functionality described herein in association with the illustrated modules may be performed by a fewer number of modules or a larger number of modules on one device or spread across multiple devices.

Figure 3:
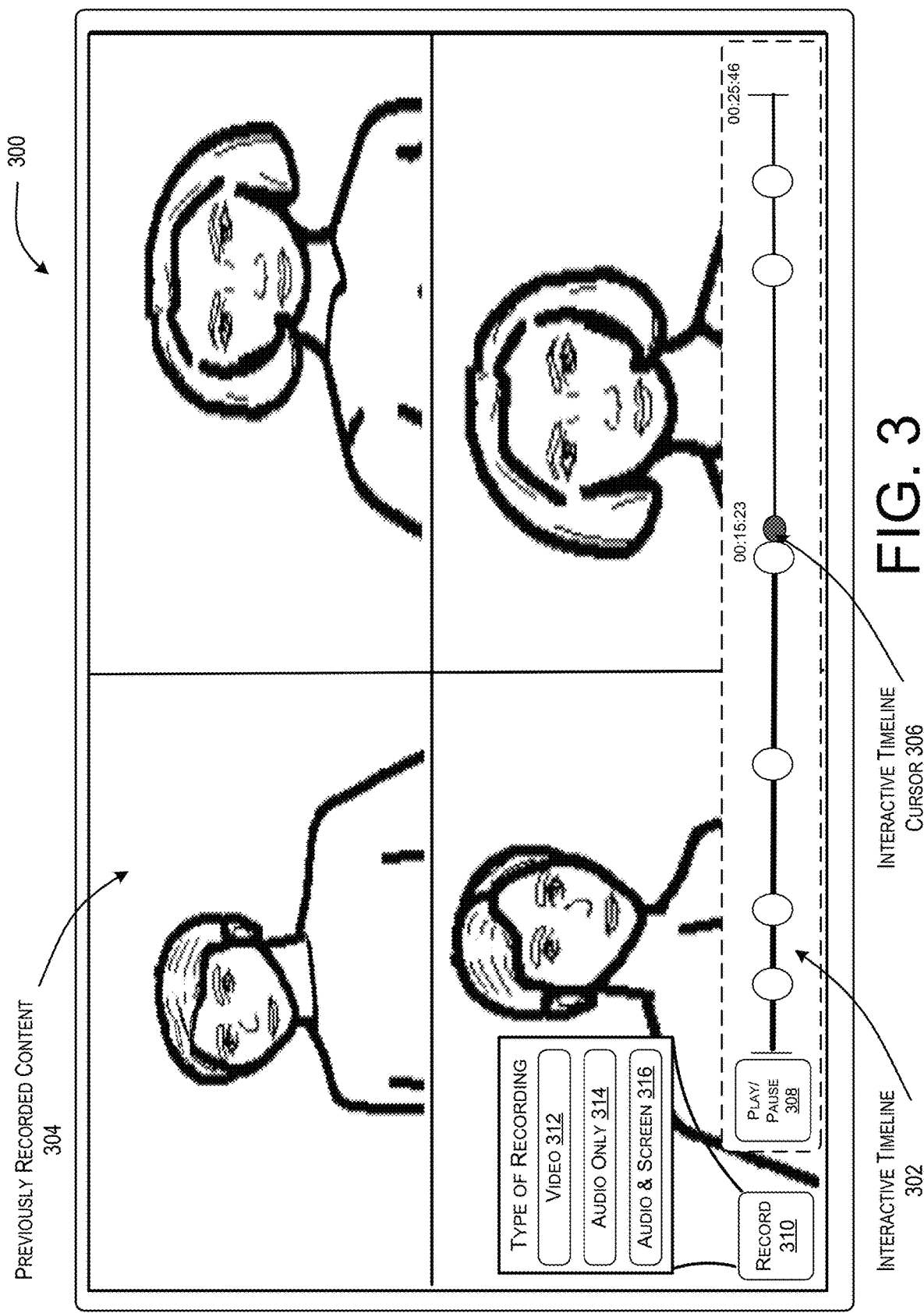
FIG. 3 illustrates an example graphical user interface configured to display an interactive timeline in association with previously recorded content and to enable a user to provide input that selects an option to add supplemental recorded content to the interactive timeline.

FIG. 3 illustrates an example graphical user interface 300 configured to display an interactive timeline 302 in association with previously recorded content 304 and to enable a user to provide input that selects an option to add supplemental recorded content to the interactive timeline 302. As described above, the interactive timeline module 146 is configured to determine when notable events 148 occur in association with a teleconference session 104 and to generate the interactive timeline 302 to include representations of the notable events 148 (e.g., populate the interactive timeline with representations). That is, the interactive timeline module 146 can analyze session data to detect when a notable event occurs (e.g., a user says a name, a user submits a comment to a chat conversation, etc.) or to identify when a user has specifically added a representation of a notable event to the interactive timeline 302 (e.g., via selection of an option to add a notable event to the interactive timeline 302). In the example of FIG. 3, the interactive timeline 302 is displayed at the bottom of the user interface 300 that is presented on a display screen (e.g., display screen 128), and a display area that includes the interactive timeline 302 is not transparent. However, in alternative examples, the display area that includes the interactive timeline can be an overlay display area that is transparent.

The interactive timeline 302 includes different representations (e.g., the circles, squares, or other shapes on the interactive timeline 302) that correspond to different types of notable events 148. In various implementations, a representation can comprise and/or be associated with: an icon or a symbol indicative of a type of notable event, a user avatar, and/or initials of a user. Furthermore, a representation can comprise and/or be associated with a still image (e.g., a thumbnail image) that captures activity of a view of the teleconference session at a point in time associated with a position of the representation on the interactive timeline 302. For instance, a thumbnail image associated with a video frame can be displayed in association with a representation (e.g., below the representation, above the representation, etc.). In some examples, the thumbnail image can be persistently displayed. Alternatively, the thumbnail image can be configured to come into view based on user interaction (e.g., hover input) with the representation.

As described above, the interactive timeline 302 enables a user to interact with representations while viewing the previously recorded content 304. Since the content being displayed is previously recorded content, the interactive timeline 302 includes representations on the left and on the right of an interactive timeline cursor 306. The interactive timeline cursor 306 represents a position, or a point, in the recording of the teleconference session that is currently being displayed. As shown, a user is currently viewing previously recorded content at "00:15:23" of a meeting that had a duration of "00:25:46". The current view at this point in time comprises content in which four people (e.g., four separate audio/visual streams) are displayed in quadrants (e.g., four grid cells). A "view" comprises a configuration and/or a layout of content of the teleconference session. FIG.

3 further illustrates a play/pause button 308 that enables a viewer to play/pause the previously recorded content that is being played back.

The graphical user interface 300 of FIG. 3 also displays an option to record 310 such that selection of the option to record 310 via input enables the user to add supplemental recorded content to the interactive timeline 302 and/or to the teleconference session. For example, a user can provide input that selects the option to record 310, and in response, can be presented with options associated with a type of recording. Example types of recordings can include video 312, audio only 314, and audio and display screen 316. For instance, in accordance with a video 312 recording, a camera and/or other data capture devices associated with a client computing device can be directed to the user to capture audio and visual data (e.g., user appearance and motion as well as speech). In accordance with an audio only 314 recording, a microphone and/or other data capture devices associated with a client computing device can capture audio data (e.g., user speech) but not visual data of the user. In accordance with an audio and display screen 316 recording, a microphone and/or other data capture devices associated with a client computing device can capture audio data (e.g., user speech), as well as content (e.g., file content) that is displayed on all or part of the display screen. In this way, a user can share file content while making audible comments about what is being displayed.

In additional examples, an option can be presented to add content that has already been recorded. For instance, a user can select the option and subsequently be prompted to access or locate the content (e.g., a prerecorded video file) on his or her device or via a remote device over a network connection. In this way, a user can add, as supplemental recorded content, content that already exists at the time the user decides to inject or append the content to the interactive timeline.

Figure 4A:
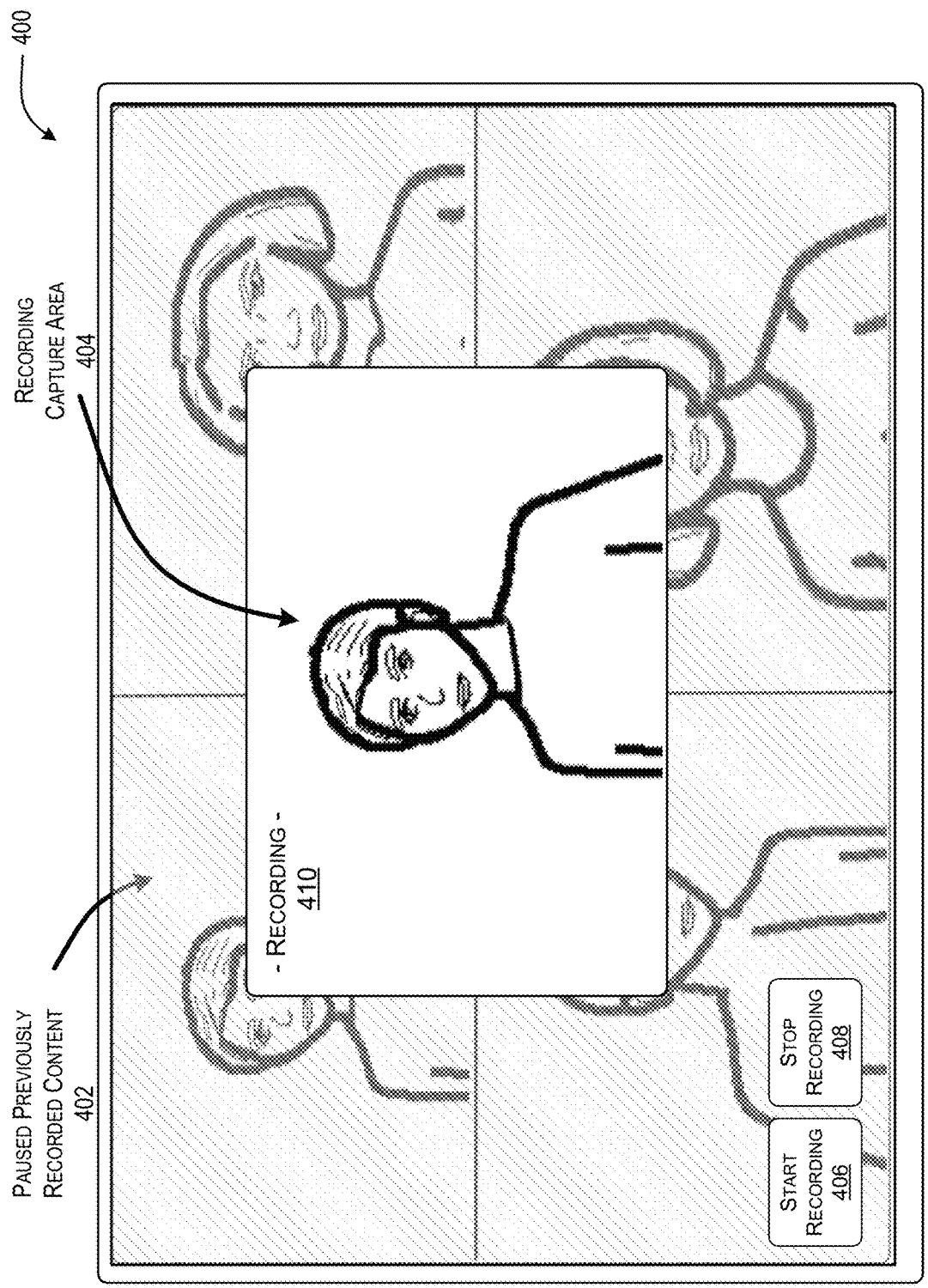
FIG. 4A illustrates an example graphical user interface configured to display the supplemental recorded content (e.g., video of a user) as the supplemental recorded content is captured (e.g., recorded).

FIG. 4A illustrates an example graphical user interface 400 configured to display the supplemental recorded content as the supplemental recorded content is being captured (e.g., recorded). This graphical user interface 400 can be displayed after the user provides input to add supplemental recorded content to the interactive timeline and/or after the user selects a type of recording, as described with respect to FIG. 3. In this example, a user has selected a video 312 recording. Consequently, the graphical user interface 400 illustrates that the previously recorded content displayed on the display screen at a position where, or time when, the user wants to add the supplemental recorded content is paused in the background (e.g., paused previously recorded content 402). Furthermore, a recording capture area 404 that reflects the content to be recorded is displayed in the foreground while the paused previously recorded content 402 is displayed in the background. A start recording option 406 and a stop recording option 408 enable the user to start and stop the recording, and the recording capture area 404 can include a recording indicator 410 to reflect when the client computing device is recording.

While FIG. 4A illustrates an overlay view in which the recording capture area 404 is displayed in the foreground and the paused previously recorded content 402 is displayed in the background, other views associated with recording content to be added can be displayed as well. For example, a concurrent view can display the paused previously recorded content 402 and the recording capture area 404 concurrently (e.g., side-by-side, top and bottom, non-overlapping display areas, etc.). In another example, an edge-to-edge view may completely replace the paused previously recorded content 402 with the recording capture area 404 in the user interface. In yet another example, the recording capture area 404 may comprise a small "Me" window that is typically configured in a corner of the user interface (e.g., the lower right corner, the upper right corner, etc.).

Via the recording capture area 404, the user can view his or her appearance, prepare for recording, and/or see what is being recorded. Moreover, additional controls can allow the user edit the recording prior to adding the recording as the supplemental recorded content to the interactive timeline.

Figure 4B:
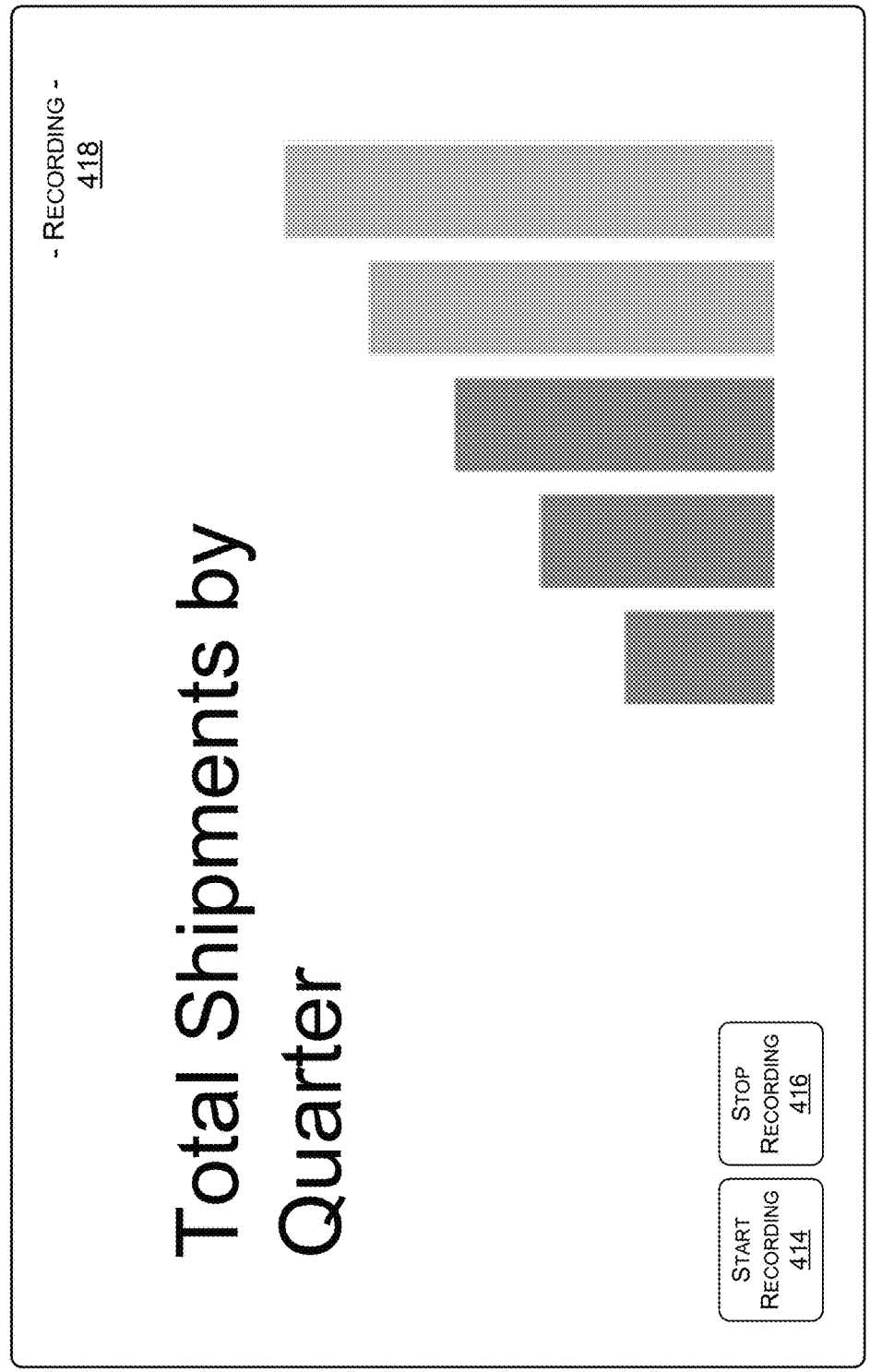
FIG. 4B illustrates another example graphical user interface configured to display the supplemental recorded content (e.g., audio of a user and file content on a display screen) as the supplemental recorded content is captured (e.g., recorded).

FIG. 4B illustrates another example graphical user interface 412 configured to display the supplemental recorded content as the supplemental recorded content is captured (e.g., recorded). This graphical user interface 412 can also be displayed after the user provides input to add supplemental recorded content to the interactive timeline and/or after the user selects a type of recording, as described with respect to FIG. 3. In this example, a user has selected an audio and display screen 316 recording. Consequently, the graphical user interface 412 illustrates that the user has switched the display screen from the previously recorded content to file content to be added as the supplemental recorded content at a position on the interactive timeline. The graphical user interface 412 also has a start recording option 414 and a stop recording option 416 to enable the user to start and stop the recording. In between starting and stopping, the user can talk about the file content displayed (e.g., "Total Shipments by Quarter") and/or edit and change the file content being displayed (e.g. switch from one slide to the next or from one page to the next). The display screen can include a recording indicator 418 to reflect when the client computing device is recording.

Figure 5:
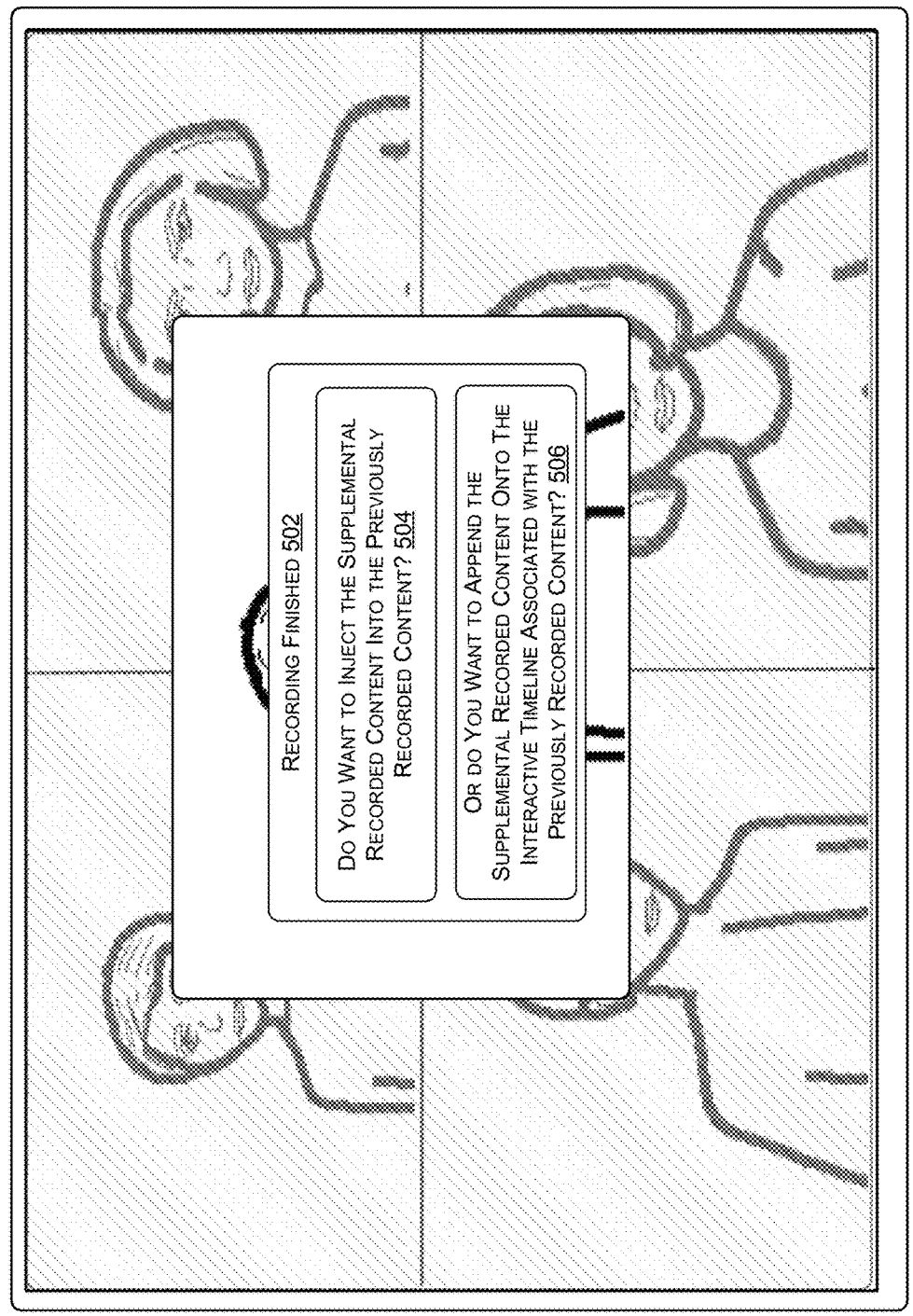
FIG. 5 illustrates an example graphical user interface configured to display options to related to how to add the supplemental recorded content to the teleconference session and/or to the interactive timeline.

FIG. 5 illustrates an example graphical user interface 500 configured to display options to related to how to add the supplemental recorded content to the teleconference session and/or to the interactive timeline. The options can be presented to the user after the recording is finished 502. A first option 504 injects the supplemental recorded content into the previously recorded content of the teleconference session thereby splitting the previously recorded content of the teleconference session at the position associated with an interactive timeline cursor. As a result, the duration (e.g., a length) of the interactive timeline and/or the teleconference session is extended and a user that subsequently views the content of the teleconference session (e.g., a full recording of the teleconference session from start to finish) views a first part of the previously recorded content until a position of injection, then views the supplemental recorded content that has been injected, and then views a second part of the previously recorded content. In some instances, injected content can be associated with a mandated or required viewing because the injected content becomes part of the full recording of the teleconference session (e.g., a viewer sees the added supplemental recorded content while consuming the teleconference session from start to finish).

A second option 506 appends the supplemental recorded content to the interactive timeline at the position associated with the interactive timeline cursor. This second option 506 can be considered less invasive to the user experience than the first option 504 because it does not split the previously recorded content. Rather, the supplemental recorded content appended to the interactive timeline is configured for optional viewing in association with the previously recorded content based on selection of a corresponding representation on the interactive timeline. Stated another way, while viewing a full recording of the teleconference session, the user consumes the supplemental recorded content only if she or he requests to view the supplemental recorded content (e.g., via selection of the representation of the supplemental recorded content on the interactive timeline).

In various examples, the first option 504 and/or the second option 506 are enabled based on credentials of a user (e.g., user authority). For example, a first set of users (e.g., a meeting host, a team supervisor, active participants, etc.) deemed to be more valuable to the teleconference session may be authorized, via user credentials, to inject content into the timeline so it is more likely that participants see the injected content. However, a second set of users (e.g., team members, passive participants, etc.) may not be authorized to inject content into the timeline, but rather may only be allowed to append content so participants can choose whether to consume the appended content.

Figure 6A:
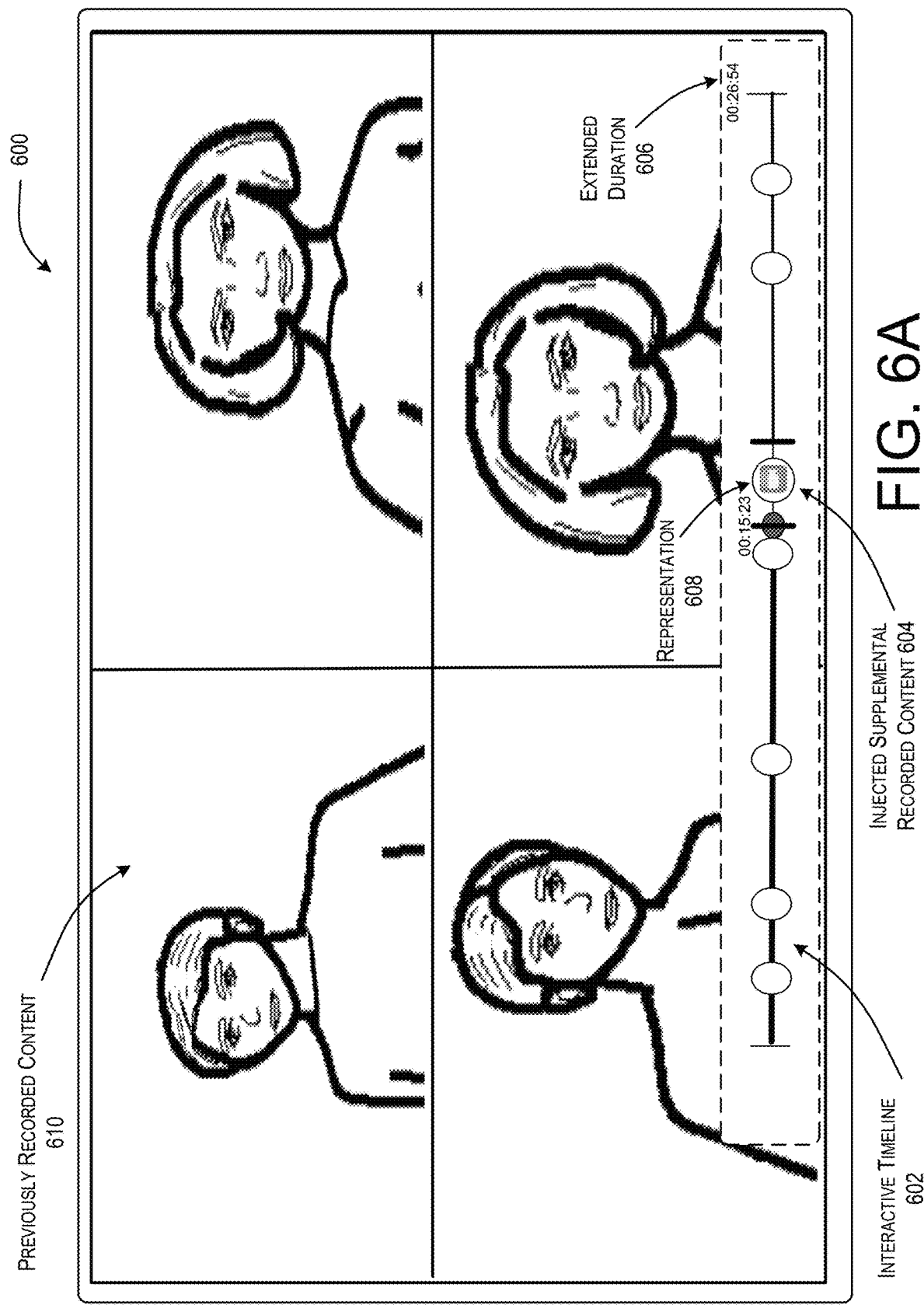
FIG. 6A illustrates an example graphical user interface that illustrates (i) how supplemental recorded content is added to the interactive timeline as injected content that splits the previously recorded content and that extends a duration (e.g., a length) of the teleconference session and (ii) a corresponding representation of the added supplemental recorded content on the interactive timeline.

FIG. 6A illustrates an example graphical user interface 600 that illustrates (i) how supplemental recorded content is added to the interactive timeline 602 as injected content 604 that splits the previously recorded content and that extends a duration 606 (e.g., a length) of the teleconference session and (ii) a corresponding representation 608 of the added supplemental recorded content on the interactive timeline 602. In various examples, the representation 608 includes an icon, a symbol, or other distinctive identifier to indicate that the notable event is a recording.

As shown in the graphical user interface 600, previously recorded content 610 currently displayed is associated with a last frame prior to or at a position of an interactive timeline cursor (e.g., at the "00:15:23" mark). After supplemental recorded content is captured in association with the examples of FIG. 4A or FIG. 4B, and after a user selects option 504 in association with the example of FIG. 5, the interactive timeline 602 is split so the supplemental recorded content 604 can be injected into the previously recorded content 610. The split is illustrated by the segment of the interactive timeline 602 associated with the representation 608. Continuing the example of FIG. 3 where the duration of the teleconference session prior to injecting supplemental recorded content is "00:25:46", the extended duration 606 in FIG. 6A is "00:26:54" and thus, a duration of the injected supplemental recorded content 604 added to the interactive timeline is one minute and eight seconds (e.g., the user adds a video that is one minute and eight seconds long).

FIG. 6B illustrates an example graphical user interface 612 that illustrates (i) how supplemental recorded content is added to the interactive timeline 614 as appended content that is configured for optional viewing and (ii) a corresponding representation 616 of the supplemental recorded content appended to the interactive timeline 614.

As shown in the graphical user interface 612, previously recorded content 618 currently displayed is associated with a last frame prior to or at a position of an interactive timeline cursor (e.g., at the "00:15:23" mark). After supplemental recorded content is captured in association with the examples of FIG. 4A or FIG. 4B, and after a user selects option 506 in association with the example of FIG. 5, a representation 616 of the appended supplemental recorded content is added to the interactive timeline 614 at the position of the interactive timeline cursor. As described above, the appended supplemental recorded content is configured for optional viewing based on input from a user. Thus, in contrast to FIG. 6A and continuing the example of FIG. 3, the duration of the teleconference session is not extended but rather remains at "00:25:46" even after the supplemental recorded content 616 is appended to the interactive timeline 614.

Figure 7:
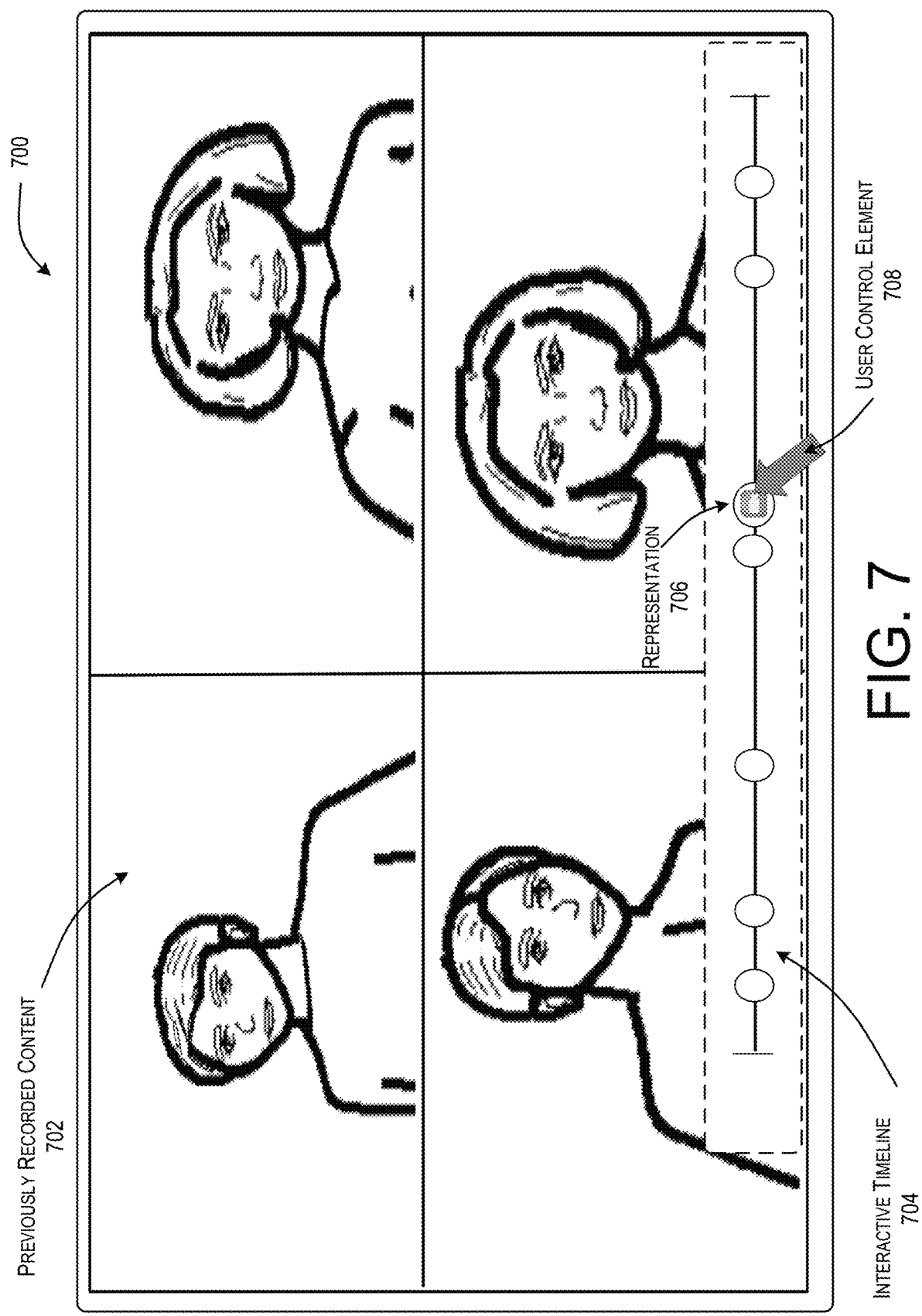
FIG. 7 illustrates an example graphical user interface that illustrates input that selects a corresponding representation of supplemental recorded content added to the interactive timeline.

FIG. 7 illustrates an example graphical user interface 700 that illustrates input that selects a corresponding representation of supplemental recorded content added to the interactive timeline (e.g., injected content or appended content). As shown, a user may be viewing previously recorded content 702 while inspecting notable events on the interactive timeline 704. Upon identifying a notable event of interest such as a representation of a recording 706, the user may navigate a user control element 708 such as a mouse cursor to the representation 706 and provide input that selects the representation 706. Based on the input that selects the representation 706, corresponding supplemental recorded content can be requested and played back to the user.

Figure 8A:
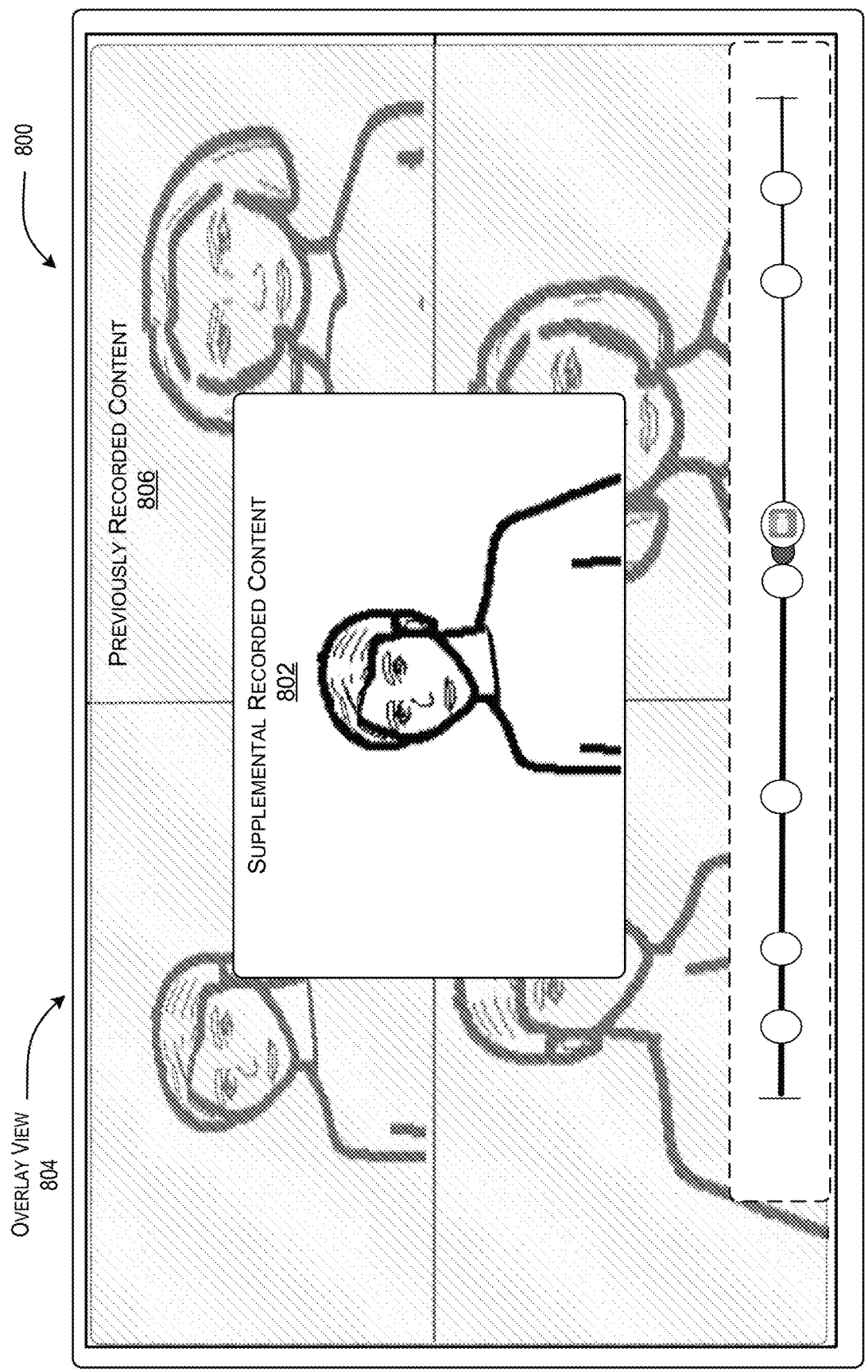
FIG. 8A illustrates an example graphical user interface configured to display the supplemental recorded content in accordance with an overlay view.

FIG. 8A illustrates an example graphical user interface 800 configured to display the supplemental recorded content 802 (e.g., injected content or appended content) in accordance with an overlay view 804. For example, upon receiving input that selects a representation corresponding to the supplemental recorded content (as illustrated in FIG. 7) or upon encountering a position on the interactive timeline at which the supplemental recorded content is added, the supplemental recorded content 802 can be displayed in the foreground while the previously recorded content 806 is paused in the background (e.g., paused at the last frame of the previously recorded content associated with a position at which the supplemental recorded content is added).

FIG. 8B illustrates an example graphical user interface 808 configured to display the supplemental recorded content 810 (e.g., injected content or appended content) in accordance with an edge-to-edge view 812. For example, upon receiving input that selects a representation corresponding to the supplemental recorded content (as illustrated in FIG. 7) or upon encountering a position on the interactive timeline at which the supplemental recorded content is added, the supplemental recorded content 810 can completely replace previously recorded content in the graphical user interface 808, such that it consumes the display area from edge-to-edge.

In some examples, playback of the supplemental recorded content based on receiving input that selects a representation corresponding to the supplemental recorded content can include some previously recorded content that immediately precedes a position on the interactive timeline at which the supplemental recorded content is injected or is appended. For instance, in FIG. 8B, a starting position 814 can be identified. The starting position 814 is associated with a predetermined amount of time (e.g., five seconds, ten seconds, thirty seconds) before the position on the interactive timeline at which the supplemental recorded content is added. Consequently, based on a selection of a representation, the playback of content can start at the identified starting position 814 so that a user views a portion of the previously recorded content that immediately precedes the supplemental recorded content 810 to gain a better understanding and awareness of the context within which the supplemental recorded content 810 is added.

Figure 8C:
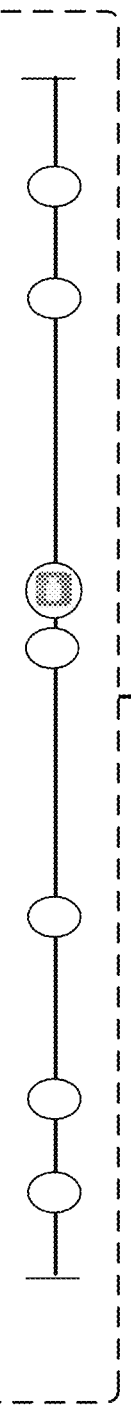
FIG. 8C illustrates an example graphical user interface configured to display the supplemental recorded content in accordance with a concurrent view.

FIG. 8C illustrates an example graphical user interface 816 configured to display the supplemental recorded content 818 (e.g., injected content or appended content) in accordance with a concurrent view 820. For example, upon receiving input that selects a representation corresponding to the supplemental recorded content (as illustrated in FIG. 7) or upon encountering a position on the interactive timeline at which the supplemental recorded content is added, the supplemental recorded content 818 can be displayed concurrently with previously recorded content 822 in the graphical user interface 816. While the concurrent view 820 in FIG. 8C is a side-by-side view, alternative concurrent views are contemplated such as a top-bottom view or any other view in which the supplemental recorded content 818 and the previously recorded content 822 are displayed within a graphical user interface concurrently (e.g., non-overlapping display areas).

In some instances, a user that is a source of the supplemental recorded content can provide input specifying a view in which the supplemental recorded content is to be displayed to others. In other instances, a view in which the supplemental recorded content is to be displayed to others can be a default view that depends on a type of previously recorded content displayed in association with a position at which the supplemental recorded content is added to the interactive timeline. For example, if the type of the previously recorded content is people content, then a default view of the supplemental recorded content can comprise an overlay view in which the supplemental recorded content is played back in the foreground while the people content is paused in the background (e.g., as shown in FIG. 8A). In another example, if the type of the previously recorded content is people content, then a default view of the supplemental recorded content can comprise an edge-to-edge view in which the supplemental recorded content completely replaces the people content (e.g., as shown in FIG. 8B). In yet another example, if the type of the previously recorded content is file content, then a default view of the supplemental recorded content can comprise a concurrent view in which the supplemental recorded content is played back adjacent to the file content (e.g., as shown in FIG. 8C). In some instances, a viewer can be presented with options so that he or she can select a preferred view for the supplemental recorded content.

Figure 9:
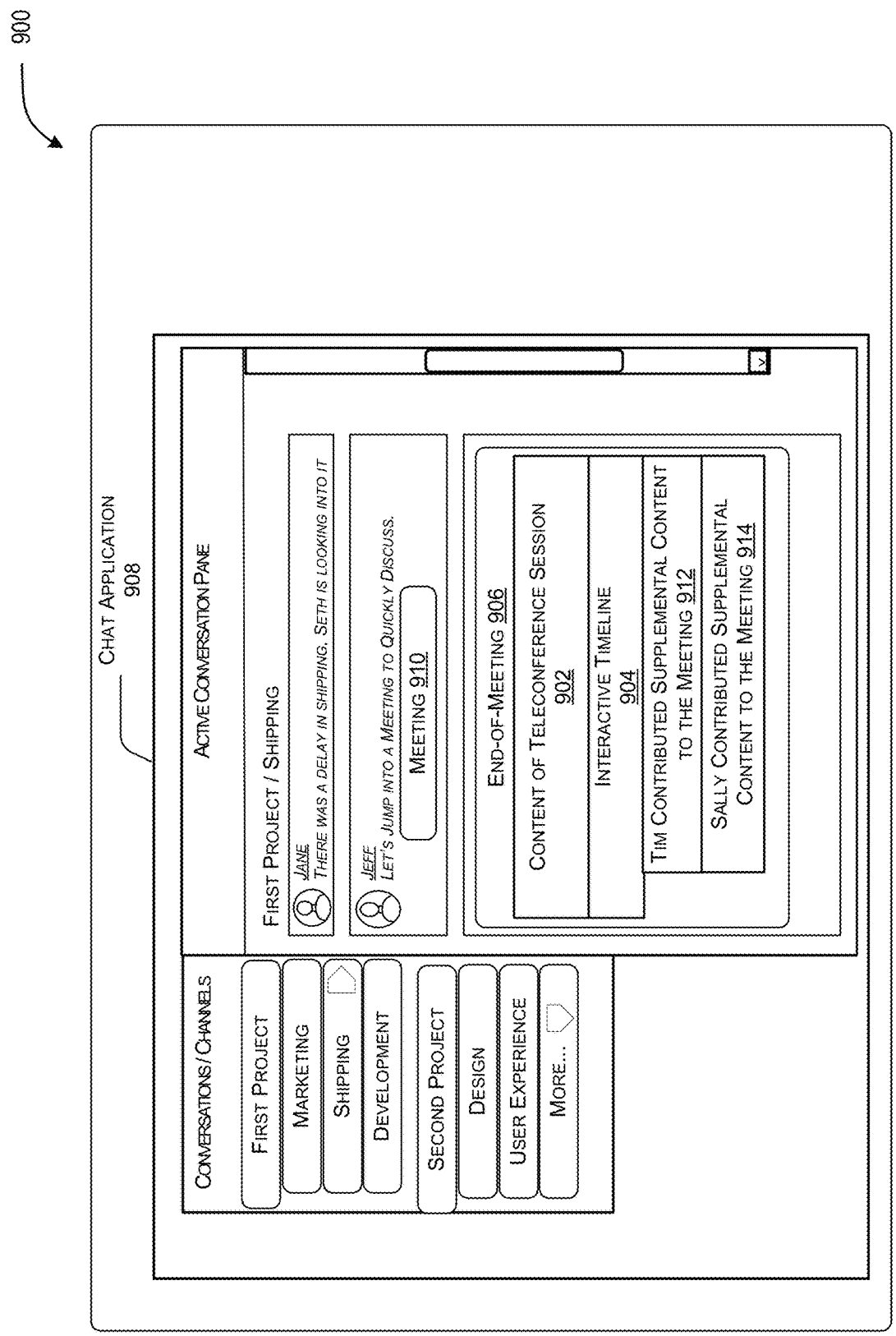
FIG. 9 illustrates an example graphical user interface configured to display (i) an interactive timeline in association with an end-of-session object and (ii) notifications of instances of supplemental recorded content that have been added to the teleconference session after a live viewing of the teleconference session has ended.

FIG. 9 illustrates an example graphical user interface 900 configured to display, and to enable a user to view, content of a teleconference session 902 and/or an interactive timeline 904 in association with an end-of-session object (e.g., an end-of-meeting object 906). In this example, the end-of-meeting object 906 is embedded in a chat conversation. The chat conversation can be hosted and implemented by an application that is external to, or separate from, a teleconference application. Thus, FIG. 9 illustrates a chat application 908 with which a user may be interacting, the chat application 908 displaying various conversations/channels and/or an active conversation pane with comments. While interacting with the active conversation pane of the chat application 908, the user can see when Jeff created a meeting object 910 and shared the meeting object with a group of users collaborating about "Shipping". Moreover, a user can see when the end-of-meeting object 906 is added to the chat conversation upon completion of a live viewing of the teleconference session. The end-of-meeting object 906 embedded in the active conversation pane enables the user to view recorded content of the teleconference session 902 and/or interact with representations of notable events on the interactive timeline 904 without leaving the active conversation pane or without leaving the chat application 908. In some examples, the end-of-meeting object 906 is automatically added to the chat conversation after the meeting has ended.

Furthermore, notifications that indicate that supplemental recorded content has been added to the interactive timeline can be generated and displayed. The notifications can be added to the end-of-meeting object 906 so that participants to the teleconference session can be made aware that a user has contributed additional activity after the live viewing of the teleconference session has already ended. For instance, FIG. 9 illustrates notifications that indicate that Tim contributed supplemental recorded content to the meeting 912 and that Sally contributed supplemental recorded content to the meeting 914.

In further examples, the interactive timeline module 146 can generate and send the notifications as messages (e.g., emails, text messages, etc.) to participants in a teleconference session.

Figure 10:
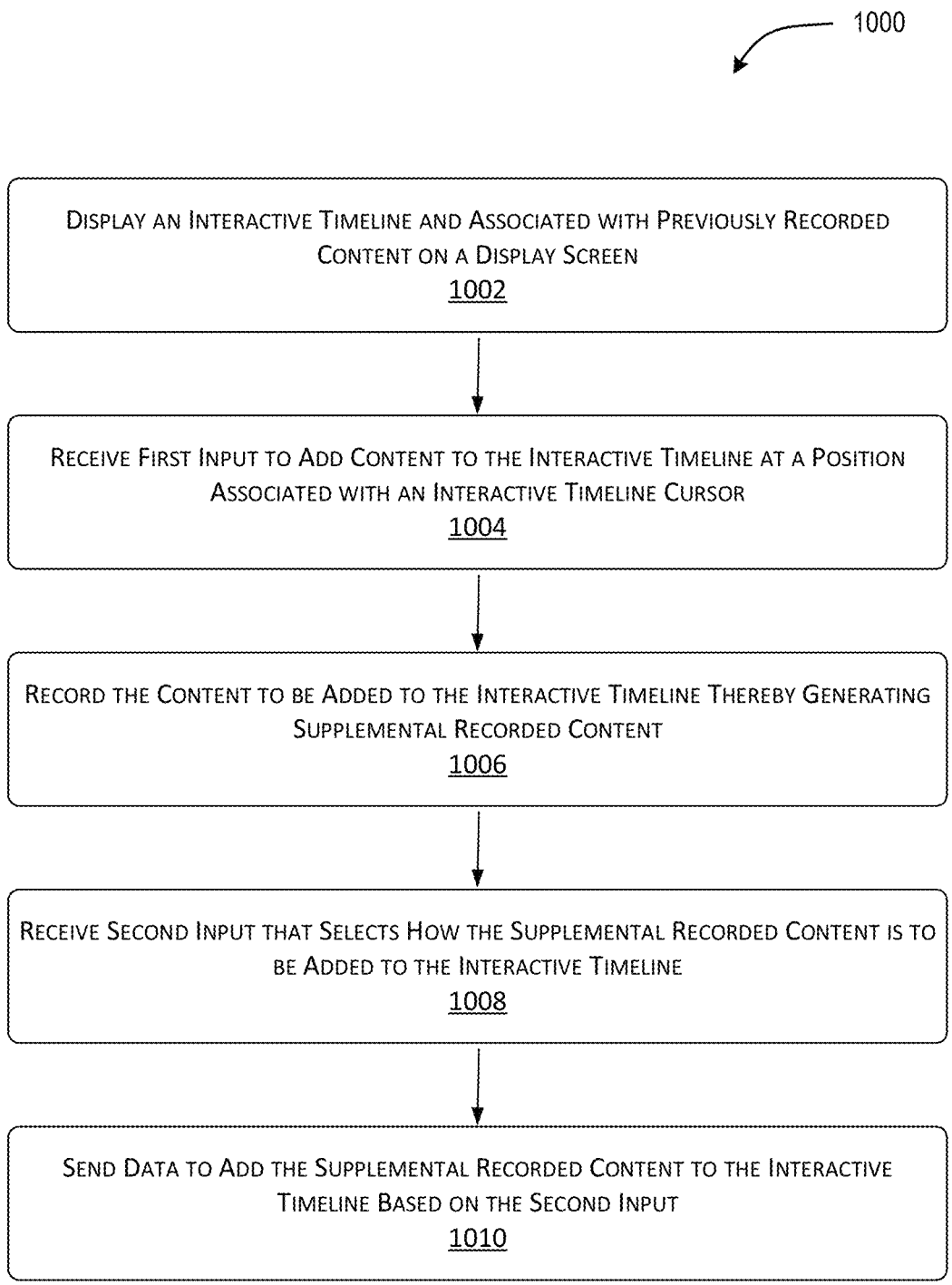
FIG. 10 is a diagram of an example flowchart that illustrates operations directed to displaying an interactive timeline associated with a teleconference session and adding supplemental recorded content to the interactive timeline and/or to the teleconference session.
Figure 11:
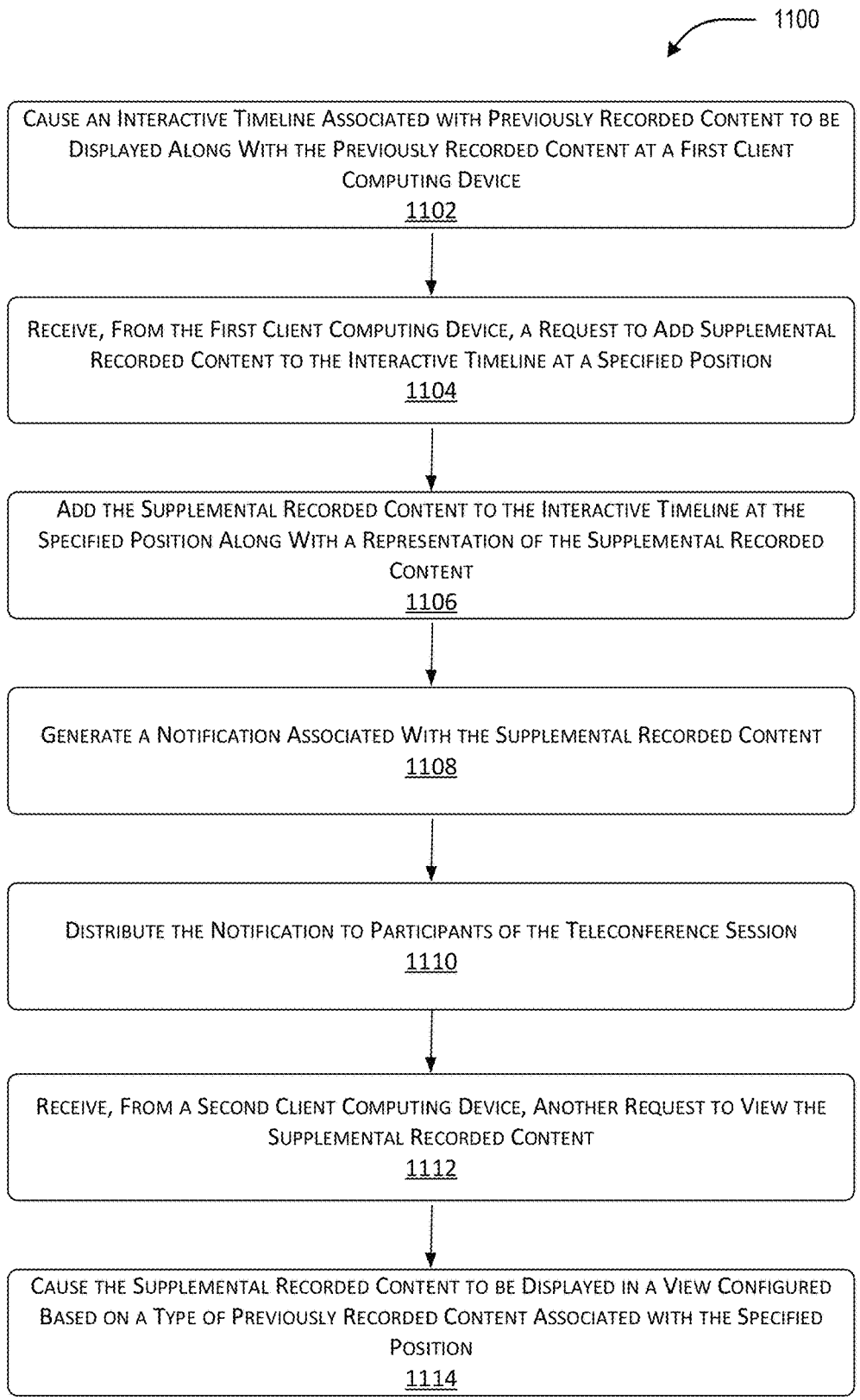
FIG. 11 is a diagram of another example flowchart that illustrates operations directed to displaying an interactive timeline associated with a teleconference session, adding supplemental recorded content to the interactive timeline, and consuming supplemental recorded content that has been added to the interactive timeline.

FIGS. 10 and 11 illustrate example flowcharts. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It also should be understood that the illustrated methods can end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system (e.g., device 110, client computing device 106(1), client computing device 106(N), and/or device 200) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIGS. 10 and/or 11 can be implemented in association with the example graphical user interfaces described above with respect to FIGS. 3-9. For instance, the various device(s) and/or module(s) in FIGS. 1 and/or 2 can generate, transmit, and/or display data associated with content of a teleconference session (e.g., previously recorded content and/or supplemental recorded content) and/or an interactive timeline that includes representations of notable events that occur in association with the teleconference session.

FIG. 10 is a diagram of an example flowchart 1000 that illustrates operations directed to displaying an interactive timeline associated with a teleconference session and adding supplemental recorded content to the interactive timeline and/or the teleconference session. In one example, the operations of FIG. 10 can be performed by components of a client computing device.

At operation 1002, an interactive timeline associated with previously recorded content of a teleconference session is displayed (e.g., on a display screen). As described above, the interactive timeline is configured to display different types of representations corresponding to different types of notable events that occur in association with the teleconference session.

At operation 1004, first input to add content to the interactive timeline at a position associated with an interactive timeline cursor is received. As described above with respect to FIG. 3, the first input can enable a video recording, an audio only recording, or an audio/display screen recording. Or, the first input can add content stored locally on a device and/or stored remotely on a remote device that is accessible via a network connection.

At operation 1006, the content to be added to the interactive timeline is recorded, thereby generating supplemental recorded content.

At operation 1008, second input that selects how the supplemental recorded content is to be added to the interactive timeline is received. For example, the second input can select an option to inject the supplemental recorded content into the previously recorded content of the teleconference session thereby splitting the previously recorded content of the teleconference session at a position associated with the interactive timeline cursor. In another example, the second input can select an option to append the supplemental recorded content to the interactive timeline at the position associated with the interactive timeline cursor.

At operation 1010, data to add the supplemental recorded content to the interactive timeline based on the second input is sent. For example, a client computing device can send, as an instruction and/or request, the supplemental recorded content (e.g., the video of the user) captured at the client computing device and additional information associated with the supplemental recorded content (e.g., a specified position on the interactive timeline, whether to inject or append the supplemental recorded content, etc.) to the system 102. Based on reception of the data, the system 102 can add a representation of the supplemental recorded content to the interactive timeline so that others can subsequently view the supplemental recorded content.

FIG. 11 is a diagram of another example flowchart 1100 that illustrates operations directed to displaying an interactive timeline associated with a teleconference session, adding supplemental recorded content to the interactive timeline, and consuming supplemental recorded content that has been added to the interactive timeline. In one example, the operations of FIG. 11 can be performed by components of the system 102.

At operation 1102, an interactive timeline associated with previously recorded content of a teleconference session is caused to be displayed along with the previously recorded content at a first client computing device.

At operation 1104, a request to add supplemental recorded content to the interactive timeline at a specified position is received from the first client computing device.

At operation 1106, the supplemental recorded content is added to the interactive timeline at the specified position along with a representation of the supplemental recorded content.

At operation 1108, a notification associated with the supplemental recorded content is generated. The notification can indicate to participants of the teleconference session that supplemental recorded content has been added.

At operation 1110, the notification is distributed to participants of the teleconference session. For example, the notification can be distributed by associating the notification with an object of the teleconference session (e.g., an end-of-session object). In another example, the notification can be distributed by sending messages to the participants of the teleconference session.

At operation 1112, another request to view the supplemental content is received from a second client computing device.

At operation 1114, the supplemental recorded content is caused to be displayed in a view configured based at least in part on a type of the previously recorded content associated with the specified position. Example views are provided with respect to FIGS. 8A-8C.

The disclosure presented herein may be considered in view of the following example clauses.

Example Clause A, a device comprising: one or more processing units; and a computer-readable medium having encoded thereon computer-executable instructions to cause the one or more processing units to: display an interactive timeline associated with previously recorded content of a teleconference session; receive first input to add content to the interactive timeline at a position associated with an interactive timeline cursor; based at least in part on receiving the first input, determining supplemental recorded content; receive second input that indicates that the supplemental recorded content is to be added to the interactive timeline by one of (i) injecting the supplemental recorded content into the previously recorded content of the teleconference session thereby splitting the previously recorded content of the teleconference session at the position associated with the interactive timeline cursor, or (ii) appending the supplemental recorded content to the interactive timeline at the position associated with the interactive timeline cursor; and send data to add the supplemental recorded content to the interactive timeline based at least in part on the second input.

Example Clause B, the device of Example Clause A, wherein the second input indicates that the supplemental recorded content is to be added to the interactive timeline by injecting the supplemental recorded content into the previously recorded content of the teleconference session, and wherein injecting the supplemental recorded content into the previously recorded content extends a duration of the teleconference session.

Example Clause C, the device of Example Clause A, wherein the second input indicates that the supplemental recorded content is to be added to the interactive timeline by appending the supplemental recorded content to the interactive timeline at the position associated with the interactive timeline cursor, and wherein appending the supplemental recorded content to the interactive timeline at the position associated with the interactive timeline cursor does not split the previously recorded content of the teleconference session at the position associated with the interactive timeline cursor.

Example Clause D, the device of Example Clause A or Example Clause C, wherein the second input indicates that the supplemental recorded content is to be added to the interactive timeline by appending the supplemental recorded content to the interactive timeline at the position associated with the interactive timeline cursor, and wherein the supplemental recorded content is configured for optional viewing in association with the previously recorded content based on selection of a corresponding representation on the interactive timeline.

Example Clause E, the device of any one of Example Clause A through Example Clause D, wherein the computer-executable instructions further cause the one or more processing units to determine the supplemental recorded content by recording one of: video content of a user, audio content of a user, or audio content of a user along with file content displayed on a display screen.

Example Clause F, the device of any one of Example Clause A through Example Clause E, wherein the computer-executable instructions further cause the one or more processing units to add a corresponding representation of the supplemental recorded content to the interactive timeline at the position associated with the interactive timeline cursor.

Example Clause G, the device of any one of Example Clause A through Example Clause F, wherein the computer-executable instructions further cause the one or more processing units to: display and playback the previously recorded content; and pause the previously recorded content based at least in part on receiving the first input so the content to be added to the interactive timeline can be recorded.

Example Clause H, the device of any one of Example Clause A through Example Clause G, wherein the second input is enabled based at least in part on credentials of a user that provides the second input.

Example Clause I, the device of any one of Example Clause A through Example Clause H, wherein the computer-executable instructions further cause the one or more processing units to receive third input selecting an option related to a view of the supplemental recorded content with respect to the previously recorded content.

While Example Clauses A through I are described above with respect to a device, it is also understood in the context of this document that the subject matter of Example Clauses A through I can be implemented by a system, via instructions stored on computer-readable storage media, and/or as a method.

Example Clause J, a system comprising: one or more processing units; and a computer-readable medium having encoded thereon computer-executable instructions to cause the one or more processing units to: cause an interactive timeline associated with previously recorded content of a teleconference session to be displayed; cause the previously recorded content of the teleconference session to be displayed; receive a request to add supplemental recorded content to the interactive timeline at a specified position by one of (i) injecting the supplemental recorded content into the previously recorded content of the teleconference session thereby splitting the previously recorded content of the teleconference session at the specified position, or (ii) appending the supplemental recorded content to the interactive timeline at the specified position; and add, based at least in part on the request, the supplemental recorded content to the interactive timeline at the specified position.

Example Clause K, the system of Example Clause J, wherein the computer-executable instructions further cause the one or more processing units to: generate a notification for an object associated with the teleconference session, the notification to indicate that the supplemental recorded content has been added to the interactive timeline; and add the notification to the object associated with the teleconference session, wherein the object comprises an end-of-session object embedded in a chat application or a calendar application.

Example Clause L, the system of Example Clause J or Example Clause K, wherein the computer-executable instructions further cause the one or more processing units to add a corresponding representation of the supplemental recorded content to the interactive timeline at the specified position.

Example Clause M, the system of Example Clause L, wherein the supplemental recorded content is configured for optional viewing in association with the previously recorded content based on selection of the corresponding representation on the interactive timeline.

Example Clause N, the system of any one of Example Clause J through Example Clause M, wherein the computer-executable instructions further cause the one or more processing units to: receive another request to view the supplemental recorded content of the teleconference session; identify another position on the interactive timeline that is associated with a predetermined amount of time that immediately precedes the specified position; cause the previously recorded content, starting at the other position, to be displayed; and subsequently cause the supplemental recorded content to be displayed.

While Example Clauses J through N are described above with respect to a system, it is also understood in the context of this document that the subject matter of Example Clauses J through N can be implemented by a device, via instructions stored on computer-readable storage media, and/or as a method.

Example Clause O, a method comprising: causing an interactive timeline associated with previously recorded content of a teleconference session to be displayed; receiving, from a first client computing device, a request to add supplemental recorded content to the interactive timeline at a specified position; adding, based at least in part on the request, the supplemental recorded content and a corresponding representation of the supplemental recorded content to the interactive timeline at the specified position; receiving, from a second client computing device, another request to view the supplemental recorded content; and causing the supplemental recorded content to be displayed in a view configured based at least in part on a type of the previously recorded content associated with the specified position.

Example Clause P, the method of Example Clause O, wherein the type of the previously recorded content associated with the specified position comprises people content and the view comprises an overlay view in which the supplemental recorded content is played back in the foreground while the people content is paused in the background.

Example Clause Q, the method of Example Clause O, wherein the type of the previously recorded content associated with the specified position comprises people content and the view comprises an edge-to-edge view in which the supplemental recorded content completely replaces the people content.

Example Clause R, the method of Example Clause O, wherein the type of the previously recorded content associated with the specified position comprises file content and the view comprises a concurrent view in which the supplemental recorded content is played back adjacent to the file content.

Example Clause S, the method of any one of Example Clause O through Example Clause R, wherein the request to add the supplemental recorded content indicates that the supplemental recorded content is to be added to the interactive timeline by injecting the supplemental recorded content into the previously recorded content of the teleconference session at the specified position, and wherein injecting the supplemental recorded content into the previously recorded content extends a duration of the teleconference session.

Example Clause T, the method of any one of Example Clause O through Example Clause R, wherein the request to add the supplemental recorded content indicates that the supplemental recorded content is to be added to the interactive timeline by appending the supplemental recorded content to the interactive timeline at the specified position, and wherein the supplemental recorded content is configured for optional viewing in association with the previously recorded content based on selection of the corresponding representation on the interactive timeline.

While Example Clauses O through T are described above with respect to a method, it is also understood in the context of this document that the subject matter of Example Clauses O through T can be implemented by a device, by a system, and/or via instructions stored on computer-readable storage media.

Although the techniques have been described in language specific to structural features and/or methodological acts, it is to be understood that the appended claims are not necessarily limited to the features or acts described. Rather, the features and acts are described as example implementations of such techniques.

The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   displaying a graphical element associated with recorded content;
   receiving first input to add content to the recorded content, the first input specifying a position within the recorded content via the graphical element;
   obtaining, based at least in part on receiving the first input, the content to add to the recorded content;
   receiving second input that indicates that the obtained content is to be added to the recorded content at the specified position by one of (i) injecting the obtained content into the recorded content or (ii) appending the obtained content to the recorded content; and
   causing, by one or more processing units and based at least in part on receiving the second input, the obtained content to be added to the recorded content.

2. The method of claim 1, wherein the second input indicates that the obtained content is to be added to the recorded content at the specified position by injecting the obtained content into the recorded content, and wherein injecting the obtained content into the recorded content extends a duration of the recorded content.

3. The method of claim 1, wherein the second input indicates that the obtained content is to be added to the recorded content at the specified position by appending the obtained content to the recorded content, and wherein the obtained content is configured for optional viewing based at least in part on selection of a marker on the graphical element.

4. The method of claim 1, wherein obtaining the content comprises recording one of: video of a user, audio of a user, or audio of a user along with file content displayed on a display screen.

5. The method of claim 1, further comprising adding a marker that corresponds to the obtained content to the graphical element based at least in part on the specified position.

6. The method of claim 1, further comprising:
   playing back the recorded content; and
   pausing the recorded content based at least in part on receiving the first input so the content to be added to the recorded content can be obtained.

7. The method of claim 1, wherein the second input is enabled based at least in part on credentials of a user that provides the second input.

8. A method comprising:
   causing recorded content to be displayed;
   receiving a request to add content to the recorded content by one of (i) injecting the content into the recorded content thereby splitting the recorded content at a position at which the content is to be added or (ii)

appending the content to the recorded content at the position at which the content is to be added; and adding, by one or more processing units and based at least in part on receiving the request, the content to the recorded content.

9. The method of claim 8, further comprising:

generating a notification for an object associated with the recorded content, the notification to indicate that the content has been added to the recorded content; and causing the notification to be displayed in association with the object, wherein the object comprises an end-of-session object embedded in a chat application or a calendar application.

10. The method of claim 8, further comprising adding, at the position, a marker that corresponds to the content to a graphical element that temporally represents the recorded content.

11. The method of claim 10, wherein the content is added to the recorded content by appending the content to the recorded content and the content is configured for optional viewing based at least in part on selection of the marker.

12. The method of claim 8, wherein the content is added by injecting the content into the recorded content, and wherein injecting the content into the recorded content extends a duration of the recorded content.

13. The method of claim 8, further comprising:

receiving another request to view the content;

identifying another position that is associated with a predetermined amount of time that immediately precedes the position;

causing the recorded content, starting at the other position, to be displayed; and subsequently causing the content to be displayed.

14. A system comprising:

one or more processing units; and a computer-readable medium having encoded thereon computer-executable instructions to cause the one or more processing units to:

cause a graphical element associated with recorded content to be displayed;

receive, from a first client computing device, a request to add content to the recorded content at a specified position;

add, based at least in part on receiving the request, the content to the recorded content;

add a marker associated with the content to the graphical element at the specified position;

receive, from a second client computing device, another request to view the added content; and cause the added content to be displayed in a view configured based at least in part on a type of the recorded content associated with the specified position.

15. The system of claim 14, wherein the type of the recorded content associated with the specified position comprises one or more video feeds of one or more users and the view comprises an overlay view in which the added content is played back in a foreground while the one or more video feeds are paused in a background.

16. The system of claim 14, wherein the type of the recorded content associated with the specified position comprises one or more video feeds of one or more users and the view comprises an edge-to-edge view in which the added content completely replaces the one or more video feeds.

17. The system of claim 14, wherein the type of the recorded content associated with the specified position comprises shared file content and the view comprises a concurrent view in which the added content is played back adjacent to the shared file content.

18. The system of claim 14, wherein the request to add the content indicates that the content is to be added by injecting the content into the recorded content at the specified position, and wherein injecting the content into the recorded content extends a duration of the recorded content.

19. The system of claim 14, wherein the request to add the content indicates that the content is to be added by appending the content to the recorded content at the specified position, and wherein the content, once added, is configured for optional viewing in association with the recorded content based on selection of a marker on the graphical element.

20. The system of claim 14, wherein the graphical element temporally represents the recorded content.

* * * * *